(12) United States Patent
Pecone et al.

(10) Patent No.: US 7,451,348 B2
(45) Date of Patent: Nov. 11, 2008

(54) DYNAMIC WRITE CACHE SIZE ADJUSTMENT IN RAID CONTROLLER WITH CAPACITOR BACKUP ENERGY SOURCE

(75) Inventors: Victor Key Pecone, Lyons, CO (US); Yuanru Frank Wang, Broomfield, CO (US)

(73) Assignee: Dot Hill Systems Corporation, Carlsbad, CA (US)

( * ) Notice: Subject to any disclaimer, the term of this patent is extended or adjusted under 35 U.S.C. 154(b) by 425 days.

(21) Appl. No.: 11/422,003

(22) Filed: Jun. 2, 2006

(65) Prior Publication Data
US 2007/0033433 A1    Feb. 8, 2007

Related U.S. Application Data

(60) Provisional application No. 60/705,997, filed on Aug. 4, 2005.

(51) Int. Cl.
*G06F 11/00* (2006.01)
(52) U.S. Cl. ........................................ 714/14
(58) Field of Classification Search ............ None
See application file for complete search history.

(56) References Cited

U.S. PATENT DOCUMENTS

| | | | |
|---|---|---|---|
| 4,874,960 A | | 10/1989 | Cybela |
| 5,414,861 A | | 5/1995 | Horning |
| 5,448,719 A | | 9/1995 | Schultz et al. |
| 5,596,708 A | | 1/1997 | Weber |
| 5,625,237 A | * | 4/1997 | Saeki et al. ............... 307/48 |
| 5,758,054 A | | 5/1998 | Katz et al. |
| 6,304,981 B1 | * | 10/2001 | Spears et al. ............ 714/24 |
| 6,829,724 B2 | * | 12/2004 | Farabaugh et al. ........ 714/14 |
| 6,838,923 B2 | | 1/2005 | Pearson |

(Continued)

FOREIGN PATENT DOCUMENTS

EP    1338874    8/2003

(Continued)

OTHER PUBLICATIONS

Aerogel, http://en.wikipedia.org/wiki/Aerogel.

(Continued)

*Primary Examiner*—Michael C Maskulinski
(74) *Attorney, Agent, or Firm*—E. Alan Davis; James W. Huffman

(57) ABSTRACT

A high data availability write-caching storage controller has a volatile memory with a write cache for caching write cache data, a non-volatile memory, a capacitor pack for supplying power for backing up the write cache to the non-volatile memory in response to a loss of main power, and a CPU that determines whether reducing an operating voltage of the capacitor pack to a new value would cause the capacitor pack to be storing less energy than required for backing up the current size write cache to the non-volatile memory. If so, the CPU reduces the size of the write cache prior to reducing the operating voltage. The CPU estimates the capacity of the capacitor pack to store the required energy based on a history of operational temperature and voltage readings of the capacitor pack, such as on an accumulated normalized running time and warranted lifetime of the capacitor pack.

34 Claims, 15 Drawing Sheets

U.S. PATENT DOCUMENTS

| | | | |
|---|---|---|---|
| 6,847,192 B2 | 1/2005 | Turner et al. | |
| 6,880,967 B2 | 4/2005 | Isozumi et al. | |
| 7,051,223 B2 * | 5/2006 | Batchelor et al. | 713/340 |
| 2002/0161970 A1 | 10/2002 | Busser | |
| 2003/0046503 A1 * | 3/2003 | Park | 711/162 |
| 2004/0054851 A1 * | 3/2004 | Acton et al. | 711/118 |
| 2005/0132178 A1 | 6/2005 | Balasubramanian | |
| 2005/0235098 A1 | 10/2005 | Tamura et al. | |
| 2005/0283648 A1 | 12/2005 | Ashmore | |
| 2006/0015683 A1 | 1/2006 | Ashmore et al. | |
| 2006/0069870 A1 * | 3/2006 | Nicholson et al. | 711/118 |
| 2006/0080515 A1 * | 4/2006 | Spiers et al. | 711/162 |
| 2006/0106990 A1 | 5/2006 | Benhase et al. | |
| 2007/0106918 A1 * | 5/2007 | Oyanagi | 713/300 |

FOREIGN PATENT DOCUMENTS

| | | |
|---|---|---|
| EP | 1603026 | 12/2005 |
| GB | 2362768 | 11/2001 |
| JP | 2004037258 | 2/2004 |

OTHER PUBLICATIONS

ATA-ATAPI, http://ata-atapi.com.

Hearst Electronic Products, Chosing flash memory; http://www.electronicproducts.com/print.asp?ArticleURL=toshiba.apr2004.html, Apr. 2004.

New Computers Based on Non-Volatile Random Access Memory. Http://www.techneon.com/paper/nvram.html, Jul. 2003.

Secure Digital SD PCMCIA Adapter, http://www.mittoni.com.au/secure-digital-sd-pcmcia-adapter-p-1182.html, Jun. 2002.

* cited by examiner

Fig. 3

Control and Status Registers

202

| NVB_FLUSH_CTRL 302 |
|---|
| NVB_RESTORE_CTRL 304 |
| NVB_RAM_START_ADDR1 306 |
| NVB_ATA_START_ADDR1 308 |
| NVB_SIZE1 312 |
| NVB_RAM_START_ADDR2 314 |
| NVB_ATA_START_ADDR2 316 |
| NVB_SIZE2 318 |
| NVB_SECTOR_COUNT 322 |
| NVB_PROGRESS 324 |
| ATA_INT_STATUS 326 |
| ATA_INT_ENABLE 328 |
| NVB_ERROR_CODE 332 |
| NVB_CONFIG 334 |
| ATA_RESET 336 |
| ATA_CRC 338 |
| ATA Direct Access Registers 342 |

RAID Controller Operation

RAID Controller Operation (Alternate Embodiment)

Fig. 8

Capacitor Lifetime Lookup Table

| Temperature (in degrees Celsius) | Lifetime (in hours) at Operating Voltage of 8.2V | Lifetime (in hours) at Operating Voltage of 7.2V |
|---|---|---|
| 10 | 5000 | 7700 |
| 11 | 4300 | 6700 |
| 12 | 3700 | 5800 |
| 13 | 3200 | 5000 |
| 14 | 2800 | 4300 |
| 15 | 2550 | 3700 |
| 16 | 2400 | 3200 |
| 17 | 2250 | 2800 |
| 18 | 2150 | 2550 |
| 19 | 2050 | 2400 |
| 20 | 2000 | 2250 |
| 21 | 1750 | 2150 |
| 22 | 1500 | 2050 |
| 23 | 1250 | 2000 |
| 24 | 1100 | 1750 |
| 25 | 1000 | 1500 |
| 26 | 990 | 1250 |
| 27 | 955 | 1100 |
| 28 | 930 | 1000 |
| 29 | 910 | 990 |
| 30 | 900 | 955 |
| 31 | 880 | 930 |
| 32 | 865 | 910 |
| 33 | 855 | 900 |
| 34 | 840 | 880 |
| 35 | 830 | 865 |
| 36 | 820 | 855 |
| 37 | 810 | 840 |
| 38 | 805 | 830 |
| 40 | 800 | 820 |

Assuming a warranted lifetime of 1000 hours, the normal temperature is 25 degrees at 8.2V and 28 degrees at 7.2V.

RAID controller operation (alternate embodiment)

DYNAMIC WRITE CACHE SIZE ADJUSTMENT IN RAID CONTROLLER WITH CAPACITOR BACKUP ENERGY SOURCE

CROSS REFERENCE TO RELATED APPLICATION(S)

This application claims priority to U.S. Provisional Application No. 60/705,997, filed Aug. 4, 2005, which is hereby incorporated by reference. This application is related to the following U.S. non-provisional applications.

| Ser. No. | Filing Date | Title |
| --- | --- | --- |
| 11/421,967 | Jun. 2, 2006 | STORAGE CONTROLLER SUPER CAPACITOR ADAPTIVE LIFE MONITOR |
| 11/421,995 | Jun. 2, 2006 | STORAGE CONTROLLER SUPER CAPACITOR DYNAMIC VOLTAGE THROTTLING |

FIELD OF THE INVENTION

The present invention relates in general to the field of using a capacitor pack as a re-chargeable backup energy supply in a storage controller, and particularly to increasing data availability as the capacitor pack ages.

BACKGROUND OF THE INVENTION

Redundant Array of Inexpensive Disk (RAID) systems have become the predominant form of mass storage systems in most computer systems today that are used in applications that require high performance, large amounts of storage, and/or high data availability, such as transaction processing, banking, medical applications, database servers, internet servers, mail servers, scientific computing, and a host of other applications. A RAID controller controls a group of multiple physical disk drives in such a manner as to present a single logical disk drive (or multiple logical disk drives) to a computer operating system. RAID controllers employ the techniques of data striping and data redundancy to increase performance and data availability.

An important characteristic of RAID controllers, particularly in certain applications such as transaction processing or real-time data capture of large data streams, is to provide fast write performance. In particular, the overall performance of the computer system may be greatly improved if the write latency of the RAID controller is relatively small. The write latency is the time the RAID controller takes to complete a write request from the computer system.

Many RAID controllers include a relatively large cache memory for caching user data from the disk drives. Caching the data enables the RAID controller to quickly return data to the computer system if the requested data is in the cache memory since the RAID controller does not have to perform the lengthy operation of reading the data from the disk drives. The cache memory may also be employed to reduce write request latency by enabling what is commonly referred to as posted-write operations. In a posted-write operation, the RAID controller reads the data specified by the computer system from the computer system into the RAID controller's cache memory and then immediately notifies the computer system that the write request is complete, even though the RAID controller has not yet written the data to the disk drives. Posted-writes are particularly useful in RAID controllers, since in some redundant RAID levels a read-modify-write operation to the disk drives must be performed in order to accomplish the system write request. That is, not only must the specified system data be written to the disk drives, but some of the disk drives may also have to be read before the user data and redundant data can be written to the disks, which, without the benefit of posted-writes, may make the write latency of a RAID controller even longer than a non-RAID controller.

However, posted-write operations make the system vulnerable to data loss in the event of a power failure. This is because the cache memory is a volatile memory that loses the user data when power is lost and the data has not yet been written to the disk drives.

To solve this problem, some RAID controllers include a battery to continue to provide power to the cache memory in the event of a loss of main power. Although the battery greatly reduces the likelihood that user data will be lost, because the energy stored in the battery is finite, the possibility still exists that the battery energy will run out before main power can be restored, in which case the user data will be lost. The minimum length of time the battery must supply power to the cache memory varies among users of RAID systems; however, many consumers require at least 72 hours in the event a power failure occurs on a weekend.

However, there are some well-known limitations associated with the use of batteries in this application. First, batteries are a relatively expensive component of the RAID controller. Second, for many of the relevant battery technologies the ability of the battery to hold a charge begins to degrade within two or three years, which is typically less than the expected lifetime of the RAID controller. Consequently, the RAID controller must be designed with the battery as a field-replaceable unit, and in many cases, as a hot-pluggable field-replaceable unit. This adds further cost to the RAID controller. Third, the operating temperature range of batteries outside of which their lifetime and performance degrade significantly is relatively small. Fourth, after the battery has been drained due to a main power outage, the RAID controller must operate in lower performance write-through cache mode until the battery is re-charged, and the re-charge time of batteries is relatively long. Fifth, as the size of cache memories increases, so does the amount of energy the battery must provide during the main power outage; given contemporary battery energy densities, the size of the battery required to provide the required amount of energy may exceed the available space within the RAID controller.

To solve this problem, U.S. patent application Ser. No. 11/226,825, filed Sep. 14, 2005 describes a storage controller that includes a capacitor pack or battery, and a non-volatile memory, such as a FLASH memory. When main power is lost, the capacitor pack or battery supplies power from its stored energy for the controller to backup, or flush, the write cache data to the non-volatile memory. Thus, advantageously, even if the capacitor pack or battery is drained and no longer able to supply power before main power is restored, the write cache data is retained in the non-volatile memory so that when main power is restored and the controller is rebooted, the write cache data is restored to the write cache and subsequently flushed to the disk drives.

Whether using a battery or a capacitor pack as the rechargeable energy source to supply backup power, it is important to monitor the energy source to insure that the energy source continues to have the capacity to store enough energy to perform the backup operation; otherwise, write cache data may be lost. When the energy source no longer has the capacity to store enough energy to perform its intended function, such as to supply power to perform a backup operation, it is said to have reached its end of life, or its lifetime has expired. If the energy source is a battery, monitoring the lifetime of the battery is relatively simple, since the typical lifetime of a battery is relatively constant for a given battery technology. For example, the lifetime of a Lithium-ion battery commonly used for applications such as a write-caching storage controller is approximately 3 years. Consequently, the remaining lifetime of a battery can be monitored simply by keeping the actual real time, or calendar time, the battery is in existence, such as via a real-time clock circuit.

In contrast to a battery, the lifetime of a capacitor is largely a non-linear function of its temperature, operating voltage, polarity changes, and excessive current draw, and the lifetime may vary widely based on these factors. For example, in a given application at a given operating voltage, a capacitor may have a lifetime as large as one million hours at an operating temperature of 10 degrees Celsius, whereas the same capacitor may have a lifetime as small as one thousand hours at an operating temperature of 80 degrees Celsius. Similarly, at a given temperature, a capacitor may have a lifetime at an operating voltage of 1.8 Volts that is almost three times its lifetime at an operating voltage of 2.5 Volts. Therefore, the simple real-time clock technique used to monitor battery lifetime is inadequate for capacitors in many applications because the variability in capacitor lifetime may pose an unacceptable risk of data loss for write-caching storage controllers.

The recommended method by capacitor manufacturers for measuring the capacitance of a capacitor (which is effectively a measure of its lifetime because its capacitance determines the amount of energy it can store) is to discharge and then recharge the capacitor, measure the current draw and time required to recharge, and calculate the capacitance from the measured values. However, this method is undesirable for write-caching storage controller applications, since it would require the write cache to be placed into write-through mode during the discharging/recharging process in order to avoid the potential loss of write cache data due to the inability to perform the backup operation in the event of a main power loss.

Therefore, what is needed is an alternate method for determining the lifetime of a capacitor pack other than monitoring the capacitor pack's real time existence or measuring its capacitance by discharging and recharging it.

Furthermore, unlike a battery, the capacitor pack may not be field-replaceable, and the storage controller manufacturer may warrant a lifetime of the capacitor pack to the consumer, or user, of the storage controller. Therefore, given the large variability of a capacitor pack lifetime, what is needed is a way to increase the likelihood that the capacitor pack reaches the lifetime that the storage controller manufacturer warranted to the user.

BRIEF SUMMARY OF INVENTION

The present invention dynamically adjusts the size of a write cache of a storage controller if reducing the operating voltage of the capacitor pack to extend its lifetime would cause the capacitor pack to no longer be capable of storing sufficient energy to backup the current size write cache to a non-volatile memory of the storage controller in the event of a main power loss. The write cache size is adjusted, if necessary, before the reduction of the operating voltage.

In one aspect, the present invention provides a method for improving the data availability of a write-caching storage controller having a capacitor pack used to supply power for backing up a volatile write cache to a non-volatile memory in response to a loss of main power. The method includes determining whether reducing an operating voltage of the capacitor pack to a new value would cause the capacitor pack to be storing less energy than required for backing up the volatile write cache to the non-volatile memory. The method also includes reducing a size of the volatile write cache, prior to the reducing the operating voltage, if the reducing the operating voltage to the new value would cause the capacitor pack to be storing less energy than required for backing up the volatile write cache to the non-volatile memory.

In another aspect, the present invention provides a high data availability write-caching storage controller. The controller includes a volatile memory with a write cache for caching write cache data. The controller also includes a non-volatile memory, coupled to the volatile memory. The controller also includes a capacitor pack, coupled to the volatile and non-volatile memory, for supplying power for backing up the write cache to the non-volatile memory in response to a loss of main power. The controller also includes a CPU, coupled to the volatile and non-volatile memory, for dynamically determining a size of the write cache. The CPU determines whether reducing an operating voltage of the capacitor pack to a new value would cause the capacitor pack to be storing less energy than required for backing up the write cache having a current the size to the non-volatile memory. The CPU reduces the size of the volatile write cache, prior to reducing the operating voltage, if reducing the operating voltage to the new value would cause the capacitor pack to be storing less energy than required for backing up the write cache having the current the size to the non-volatile memory.

In another aspect, the present invention provides a method for improving the data availability of a write-caching storage controller having a capacitor pack used to supply power for backing up a volatile write cache to a non-volatile memory in response to a loss of main power. The method includes determining a size of the volatile write cache for which the capacitor pack would have a capacity to store enough energy to backup the size volatile write cache to the non-volatile memory if an operating voltage of the capacitor pack was reduced to a new value. The method also includes reducing the volatile write cache to the size, prior to reducing the operating voltage to the new value, if the size is less than a current size of the write cache.

In another aspect, the present invention provides a high data availability write-caching storage controller. The controller includes a volatile memory having a write cache for caching write cache data. The controller also includes a non-volatile memory, coupled to the volatile memory. The controller also includes a capacitor pack, coupled to the volatile and non-volatile memory, for supplying power for backing up the write cache to the non-volatile memory in response to a loss of main power. The controller also includes a CPU, coupled to the volatile and non-volatile memory. The CPU determines a size of the volatile write cache for which the capacitor pack would have a capacity to store enough energy to backup the size volatile write cache to the non-volatile memory if an operating voltage of the capacitor pack was reduced to a new value. The CPU also reduces the volatile write cache to the size, prior to reducing the operating voltage to the new value, if the size is less than a current size of the write cache.

BRIEF DESCRIPTION OF THE DRAWINGS

FIG. 3 is a block diagram illustrating the CSRs of FIG. 2 according to the present invention.

FIG. 8 is a block diagram illustrating a table, or database, for storing lifetimes of the capacitor pack of FIG. 1 for various temperature and voltage combinations according to the present invention.

DETAILED DESCRIPTION

Figure 1:
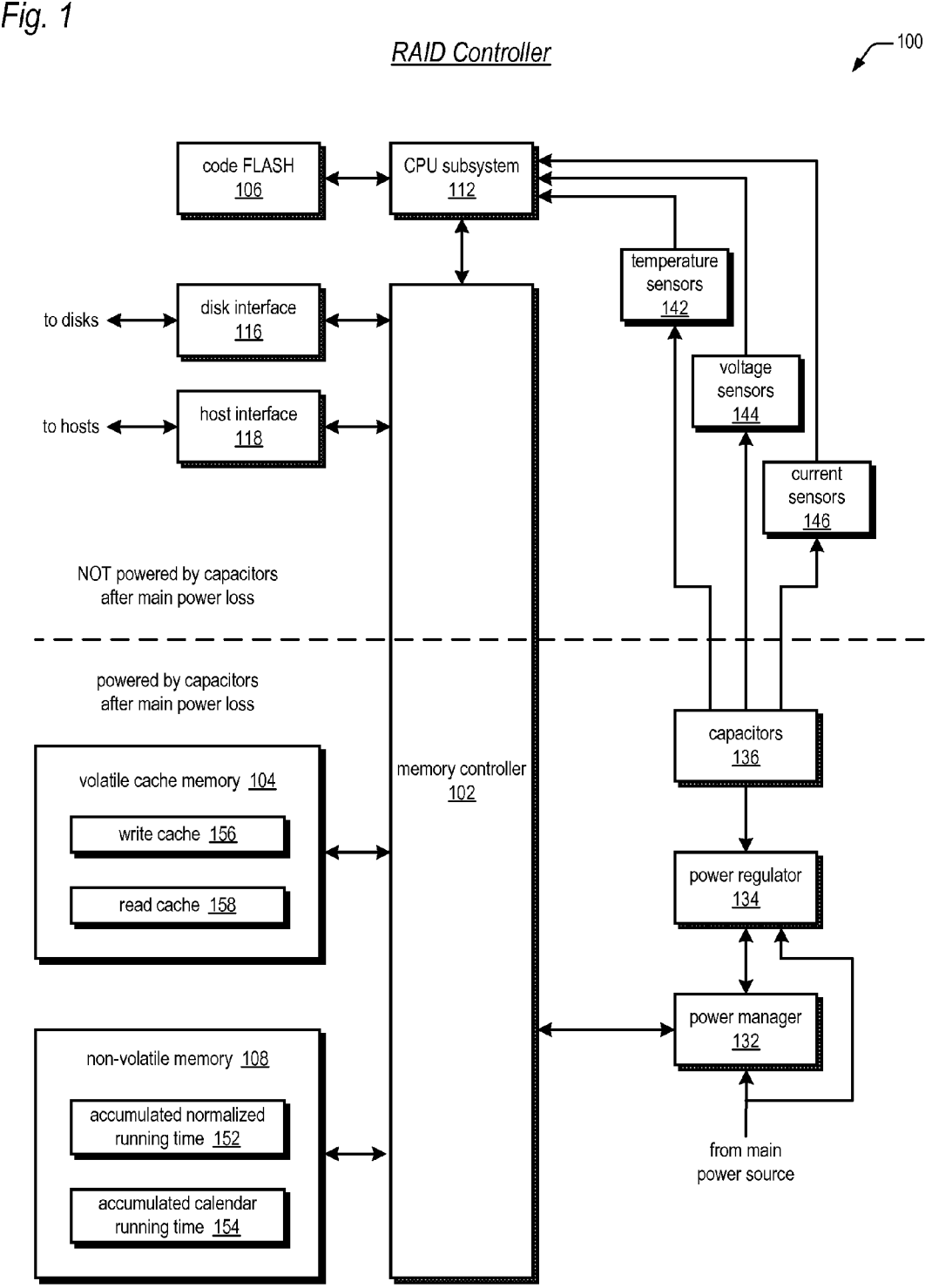
FIG. 1 is a block diagram illustrating a RAID controller according to the present invention.

Referring now to FIG. 1, a block diagram illustrating a RAID controller 100 according to the present invention is shown. In one embodiment, the RAID controller 100 may be one of a pair of active-active redundant fault-tolerant RAID controllers for providing high data availability. In the event of a failure of one RAID controller 100, such as the failure to flush posted-write data from volatile memory to non-volatile memory as described herein, the system may failover to the other RAID controller 100. The RAID controller 100 includes one or more capacitors for supplying power to selected portions of the RAID controller 100 circuits during the loss of main power for enabling a memory controller thereof to quickly and efficiently flush the posted-write data from a cache memory to a non-volatile memory. Advantageously, the RAID controller 100 periodically samples the temperature and voltage of the capacitors and adaptively calculates an effective age of the capacitors using lifetime characteristic information to normalize operating intervals of the capacitors based on empirically gathered lifetime information for each sampled temperature and voltage value combination. Furthermore, the RAID controller 100 dynamically adjusts the operating voltage of the capacitors, such as in response to an increase in temperature, based on the capacitor's effective age in order to insure the capacitors reach the lifetime warranted to users. Finally, if the controller determines that the capacitance of the capacitors has dropped such that they would not be capable of storing enough energy to perform the backup operation at the newly adjusted voltage, the controller dynamically reduces the size of the write cache to a size for which the capacitors have the capacity to store enough energy to perform the backup operation.

The RAID controller 100 includes a host interface 118 for interfacing with host computers. In one embodiment, the RAID controller 100 is a local bus-based controller, such as a controller that plugs into, or is integrated into, a local I/O bus of the host computer system, such as a PCI, PCI-X, Compact-PCI, PCI-Express, PCI-X2, EISA, VESA, VME, RapidIO, AGP, ISA, 3GIO, HyperTransport, Futurebus, MultiBus, or any other local bus. In this type of embodiment, the host interface 118 comprises a local bus interface of the local bus type. In another embodiment, the RAID controller 100 is a standalone controller in a separate enclosure from the host computers that issue I/O requests to the RAID controller 100. For example, the RAID controller 100 may be part of a storage area network (SAN). In this type of embodiment, the host interface 118 may comprise various interfaces such as Fibre Channel, Ethernet, InfiniBand, SCSI, HIPPI, Token Ring, Arcnet, FDDI, LocalTalk, ESCON, FICON, ATM, SAS, SATA, iSCSI, and the like.

The RAID controller 100 also includes a disk interface 116 for interfacing to disk drives or other mass storage devices, including but not limited to, tape drives, solid-state disks (SSD), and optical storage devices, such as CDROM or DVD drives. The disk drives store user data. The disk interface 116 may include, but is not limited to, the following interfaces: Fibre Channel, Small Computer Systems Interface (SCSI), Advanced Technology Attachment (ATA), Serial Attached SCSI (SAS), Serial Advanced Technology Attachment (SATA), Ethernet, Infiniband, HIPPI, ESCON, iSCSI, or FICON. The RAID controller 100 reads and writes data from or to the disk drives in response to I/O requests received from host computers.

The RAID controller 100 also includes a volatile cache memory 104, or cache memory 104, or volatile memory 104. The volatile cache memory 104 includes a write cache 156 and a read cache 158. The volatile cache memory 104 is volatile because it ceases to store its data when it is not powered. In one embodiment, the volatile cache memory 104 comprises double-data-rate synchronous dynamic random access memory (DDR SDRAM), which includes a self-refresh mode. When the SDRAM is placed into self-refresh mode, the SDRAM consumes less power than when not operating in self-refresh mode. In other embodiments, the volatile cache memory 104 may include other types of volatile memory, including but not limited to static random access memory (SRAM). The amount of volatile cache memory 104 may be significant. Embodiments in which the volatile cache memory 104 comprises 512 MB, 1 GB, and 2 GB are contemplated; however, other embodiments are contemplated in which more or less volatile cache memory 104 is included on the RAID controller 100.

The volatile cache memory 104 is employed by the RAID controller 100 to buffer data transferred between the hosts and disks. When a host requests data to be written to the disks, the RAID controller 100 transfers the data from the host via the host interface 118 into the write cache 156 of the volatile cache memory 104 and subsequently transfers the data from the write cache 156 via the disk interface 116 to the disks.

Conversely, when a host requests data to be read from the disks, the RAID controller 100 transfers the data from the disks via the disk interface 116 to the read cache 158 of the volatile cache memory 104 and subsequently transfers the data from the read cache 158 via the host interface 118 to the host.

As mentioned above, when a host requests data be written to the disks, the RAID controller 100 transfers the data from the host via the host interface 118 into the volatile cache memory 104 and subsequently transfers the data from the volatile cache memory 104 via the disk interface 116 to the disks. Normally, the RAID controller 100 does not indicate to the host that the write request is complete until the data is actually written to disk. However, if configured to do so, the RAID controller 100 may cache the data in the volatile cache memory 104 and indicate to the host that the write request is complete before the data is actually written to the disk, and then subsequently write, or flush, the data to disk. This operation is referred to as write-caching, or may also be referred to as a posted-write operation. The data associated with a posted-write operation is referred to as posted-write data, or write-cache data. That is, posted-write data is data stored in the volatile cache memory 104 that has not yet been written to disk but concerning which the RAID controller 100 has told the host that the write operation has completed. Additionally, the posted-write data as referred to herein may comprise metadata, which is used to refer to control information required to write the data to disk, including but not limited to, the logical block addresses and disk drive unit numbers to which the data must be written, and information specifying whether the data is part of a RAID array with a RAID level requiring redundant data to be generated based on the posted-write data that also must be written to disk.

The volatile cache memory 104 may also be used by the RAID controller 100 to perform read-caching of data, i.e., to provide requested data to the hosts from the volatile cache memory 104, rather than from the disks, if the requested data is already present in the volatile cache memory 104 because of a previous read request of the same data. Finally, the RAID controller 100 may use the volatile cache memory 104 for buffering redundant RAID data generated for writing to the disks.

The RAID controller 100 also includes a CPU subsystem 112 for fetching and executing program instructions to control the transfer of data between the disk drives and the hosts, such as described above. The CPU subsystem 112 may include any processor capable of executing stored programs, including but not limited to, for example, a processor and chipset, such as an x86 architecture processor and what are commonly referred to as a North Bridge or Memory Control Hub (MCH) and a South Bridge or I/O Control Hub (ICH), which includes I/O bus interfaces, such as an interface to an ISA bus or a PCI-family bus. In one embodiment, the CPU subsystem 112 comprises a Transmeta TM8800 processor that includes an integrated North Bridge and an ALi M1563S South Bridge. In another embodiment, the CPU subsystem 112 comprises an Intel Celeron M processor and an MCH and ICH. In another embodiment, the CPU subsystem 112 comprises an AMD Mobile Sempron processor with an integrated North Bridge and an Ali M1563S South Bridge. In one embodiment, the CPU subsystem 112 also includes RAM for storing program instructions that are fetched and executed by the microprocessor and a FLASH memory 106, coupled to the CPU subsystem 112, for storing the program instructions in a non-volatile manner and which is decompressed and written to the program RAM for execution by the microprocessor. In one embodiment, the FLASH memory 106 also stores information, such as a signature, for comparing with a signature written to a non-volatile memory 108 (described below) to indicate a successful flush of the cache memory 104 to the non-volatile memory 108, as described below.

The CPU subsystem 112 receives host computer I/O requests from the host interface 118 and processes the requests. Processing the requests may include various functions. For example, the host I/O request specifies a logical block number and number of blocks of data to be transferred to or from the redundant array; however, these logical blocks and number of blocks do not typically correspond to the appropriate physical block numbers and number of blocks on the physical disks comprising the redundant array. Therefore, the logical block number specified in the host I/O request must be translated into the appropriate physical block number, number of blocks, and disk to be used in performing one or more data transfers between the RAID controller 100 and the disks comprising the redundant array. This translation function is performed by the CPU subsystem 112. In one embodiment, the CPU subsystem 112 performs the translation according to well-known RAID techniques. After performing the translation, the CPU subsystem 112 programs the disk interface 116 to perform the data transfers between the disks and the volatile cache memory 104. Additionally, the CPU subsystem 112 programs the host interface 118 to perform data transfers between the host computers and the volatile cache memory 104. Thus, when processing a host I/O request to write data from a host computer to a redundant array, the CPU subsystem 112 programs the host interface 118 to transfer data from the host computer to the volatile cache memory 104; after the data is received into the volatile cache memory 104, the CPU subsystem 112 programs the disk interface 116 to transfer the data from the volatile cache memory 104 to the translated appropriate physical block numbers of the disks comprising the redundant array. Conversely, when processing a host I/O request to read data from a redundant array to a host computer, the CPU subsystem 112 programs the disk interface 116 to transfer the data to the volatile cache memory 104 from the translated appropriate physical block numbers of the disks comprising the redundant array; after the data is received into the volatile cache memory 104, the CPU subsystem 112 programs the host interface 118 to transfer the data to the host computer from the volatile cache memory 104. The CPU subsystem 112 also performs the function of managing allocation of portions of the volatile cache memory 104 for performing the data transfers, and in particular of cache management, i.e., managing the volatile cache memory 104 as a cache memory for caching portions of the data buffered in volatile cache memory 104 in order to improve I/O performance between the redundant arrays and the host computers according to well-known caching techniques. In one embodiment, the CPU subsystem 112 performs exclusive-OR operations of the data required in certain RAID levels that employ parity data as the redundant data, such as RAID level 5, for example. In one embodiment, the CPU subsystem 112 programs a dedicated exclusive-OR circuit comprised within the memory controller 102 to perform the exclusive-OR operation on the user data to generate the redundant parity data.

The RAID controller 100 also includes a non-volatile memory 108. The non-volatile memory 108 is non-volatile because it continues to store its data when it is not powered. In one embodiment, the non-volatile memory 108 comprises a Compact FLASH memory device comprising NAND Flash devices and a controller that presents an ATA interface to a memory controller 102 (which is described below). Embodiments in which the non-volatile memory 108 comprises 256

MB, 512 MB, and 1 GB contemplated; however, other embodiments are contemplated in which more or less non-volatile memory 108 is included on the RAID controller 100. In one embodiment, the non-volatile memory 108 comprises a micro-disk drive. The non-volatile memory 108 is used by the RAID controller 100 to backup, or flush, the contents of the volatile cache memory 104, particularly the posted-write data, in response to a loss of main power so that when main power returns the posted-write data may be restored from the non-volatile memory 108 to the volatile cache memory 104. In one embodiment, the non-volatile memory 108 comprises a NAND Flash memory array to which the memory controller 102 writes directly. Preferably, each NAND Flash memory device in the array comprises an 8-bit wide data device and the devices are arranged such that the memory controller 102 performs 16-bit or 32-bit wide write accesses to the non-volatile memory 108 to increase the write rate, thereby further decreasing the flush operation time. Software executing on the CPU 112 stores an accumulated normalized running time 152 and an accumulated calendar running time 154 in the non-volatile memory 108. In an alternative embodiment, the software executing on the CPU 112 stores the accumulated normalized running time 152 and an accumulated calendar running time 154 in the code FLASH memory 106. The use of the accumulated normalized running time 152 and accumulated calendar running time 154 are described in detail below.

The RAID controller 100 also includes a memory controller 102, coupled to the disk interface 116, host interface 118, cache memory 104, and non-volatile memory 108. The memory controller 102 controls accesses by the disk interface 116, host interface 118, and CPU subsystem 112 to the cache memory 104 and non-volatile memory 108. In one embodiment, the memory controller 102 also functions as a bus bridge for bridging communications between the volatile cache memory 104 bus, the non-volatile memory 108 bus, the CPU subsystem 112 bus, and the host interface 118 and disk interface 116 buses. In one embodiment, the memory controller 102 is a custom large scale integrated circuit. In one embodiment, the memory controller 102 comprises a custom programmable logic device. The memory controller 102 is described in more detail below with respect to FIG. 2.

During normal operation, the RAID controller 100 receives power from a main power source external to the RAID controller 100, including but not limited to a common commercially-supplied A/C power source, as is well known in the art of power supplying. However, the RAID controller 100 also includes one or more capacitors 136, or capacitor pack 136, for supplying power to the RAID controller 100 in the event of a loss of main power, as described in more detail below. If some or all of the charge, or energy store, on the capacitors 136 is depleted because of a main power outage, the capacitors 136 are re-charged from the main power source once main power is restored. In one embodiment, the capacitors 136 employ Aerogel carbon technology as an active material and are configured as an array of parallel capacitors in a single package. In one embodiment, the capacitors 136 comprise four model B1860-2RS107 PowerStor B Series Aerogel Supercapacitors manufactured by Cooper Bussman of Boynton Beach, Fla., a division of Cooper Industries. However, other embodiments are contemplated, and the present invention is not limited to a particular capacitor model or capacitor technology.

The RAID controller 100 also includes a power regulator 134, coupled to receive power from both the capacitors 136 and the main power source. The power regulator 134 senses whether the main power source is supplying power, and if so, regulates the main power source to provide power to the various RAID controller 100 circuits. If the main power source is not supplying adequate power, the power regulator 134 regulates the capacitors 136 to provide power to a subset of the RAID controller 100 circuits, as described in more detail below.

The RAID controller 100 also includes a power manager 132, coupled to the power regulator 134 and to the memory controller 102. The power manager 132 also senses whether the main power source is supplying power. If the power manager 132 senses a loss of main power, the power manager 132 selectively instructs the memory controller 102 to flush the posted-write data from the cache memory 104 to the non-volatile memory 108, as described in detail below. In one embodiment, the power manager 132 comprises a micro-complex programmable logic device (CPLD) that consumes very low power. Additionally, other circuits may be employed to perform the functions described herein that are performed by the power manager 132, such as custom integrated circuits or discrete components.

In the embodiment of FIG. 1, when main power is lost, the capacitors 136 supply power only to the cache memory 104, the non-volatile memory 108, the memory controller 102, and power manager 132, and other circuits required to keep those circuits operational, such as bus terminators of the high-speed memory bus coupling the memory controller 102 to the cache memory 104. That is, the capacitors 136 supply power only to the circuits required to perform the flush operation of the posted-write data from the cache memory 104 to the non-volatile memory 108. Advantageously, the capacitors 136 do not supply power to the circuits not required to perform the flush, namely the CPU subsystem 112, disk interface 116, host interface 118, and unneeded portions of the memory controller 102, such as the portions for interfacing with the CPU subsystem 112, disk interface 116, and host interface 118.

In the present disclosure, a flush operation refers to a copying of data from the cache memory 104 to the non-volatile memory 108 in response to a loss of main power, whereas a restore operation refers to a copying of data from the non-volatile memory 108 to the cache memory 104 after main power is restored. The RAID controller 100 selectively performs a restore operation when main power is restored, as described below.

The RAID controller 100 also includes temperature sensors 142 that sense the ambient temperature of the capacitor pack 136 and provide the sampled temperature to the CPU 112. Additionally, the RAID controller 100 also includes voltage sensors 144 that sense the voltage of the capacitor pack 136 and provide the sampled voltage to the CPU 112. Furthermore, the RAID controller 100 also includes current sensors 146 that sense the current drawn by the capacitor pack 136 when charging and provide the sampled current to the CPU 112. In one embodiment, the CPU 112 reads the sampled temperature, voltage, and current values via the memory controller 102 and/or power manager 132. In one embodiment, the temperature sensors 142, voltage sensors 144, and current sensors 146 comprise an I²C slave device that includes an analog-to-digital converter. The CPU 112 uses the sampled temperature, voltage, and current values to monitor and maintain the lifetime of the capacitor pack 136, as described below in detail.

Figure 2:
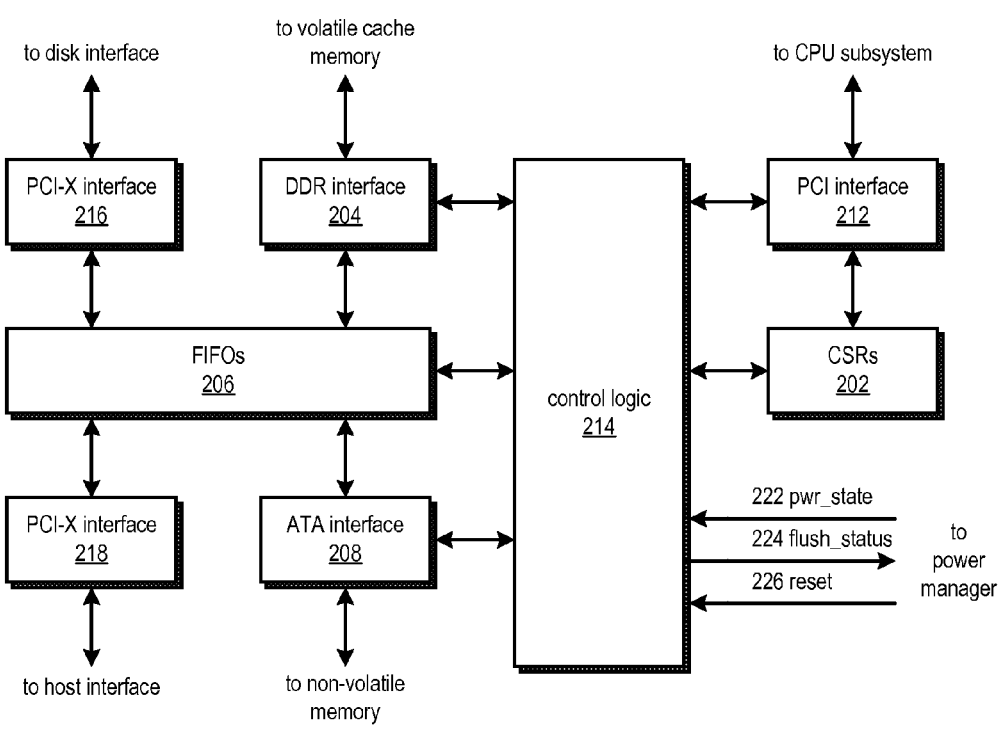
FIG. 2 is a block diagram illustrating in more detail the memory controller of FIG. 1 according to the present invention.

Referring now to FIG. 2, a block diagram illustrating in more detail the memory controller 102 of FIG. 1 according to the present invention is shown. The memory controller 102 includes control logic 214 for controlling various portions of the memory controller 102. In one embodiment, the control logic 214 includes a direct memory access controller (DMAC) that copies the data from the volatile cache memory 104 to the non-volatile memory 108 during the flush operation.

The control logic 214 receives a reset signal 226 from the power manager 132 of FIG. 1. When the power manager 132 asserts the reset signal 226, the memory controller 102 is reset. The power manager 132 is configured to selectively reset the cache memory 104 in such a manner that when the RAID controller 100 is reset or when main power is restored, if the contents of the cache memory 104 are still valid, the memory controller 102 does not invalidate the contents of the cache memory 104. For example, if the cache memory 104 is in the process of performing a flush operation, the power manager 132 does not reset the memory controller 102, thereby enabling the CPU subsystem 112 to gracefully abort the flush operation, as described below.

The control logic 214 also receives a pwr_state signal 222 from the power manager 132. The power manager 132 instructs the memory controller 102 to perform actions via the pwr_state signal 222 as described in Table 1 below. In particular, the power manager 132 instructs the memory controller 102 to flush the cache memory 104 contents to the non-volatile memory 108 with one value of the pwr_state signal 222 and instructs the memory controller 102 to place the cache memory 104 into self-refresh mode with another value of the pwr_state signal 222, in response to different events, such as a loss of main power or completion of a flush operation, as discussed below.

TABLE 1

PWR_STATE Signal

00 Reserved.
01 Flush cache memory to non-volatile memory.
   Complete transactions on PCI-X buses then disable PCI-X operation.
   Flush internal FIFOs to cache memory. Initiate DMA operation to flush cache memory data specified in CSRs to non-volatile memory via ATA interface.
10 Place cache memory into self-refresh mode.
   Complete transactions on PCI-X buses then disable PCI-X operation.
   Flush internal FIFOs to cache memory then place the cache memory into self-refresh mode.
11 Normal operation.
   Allow normal data transfers on all buses.

The control logic 214 also provides a flush_status signal 224 to the power manager 132. The memory controller 102 provides the power manager 132 with the current cache memory 104 to non-volatile memory 108 flush state via the flush_status signal 224 as described in Table 2 below. In particular, the memory controller 102 indicates to the power manager 132 via the flush_status signal 224 whether or not a flush operation is in progress, and whether or not a flush operation has completed with or without errors.

TABLE 2

FLUSH_STATUS Signal

00 Non-Flush Operation. Normal memory controller operation.
01 Flush In-Progress.
10 Flush Completed With Errors (ECC, ATA, or Aborted).
11 Flush Completed Successfully.

The memory controller 102 also includes a local bus interface 216 (such as a PCI-X interface) for interfacing the memory controller 102 to the disk interface 116; another local bus interface 218 (such as a PCI-X interface) for interfacing the memory controller 102 to the host interface 118; a memory bus interface 204 (such as a DDR SDRAM interface) for interfacing the memory controller 102 to the cache memory 104; and an ATA interface 208 for interfacing the memory controller 102 to the non-volatile memory 108. The local bus interfaces 216 and 218, memory bus interface 204, and ATA interface 208 are all coupled to the control logic 214 and are also coupled to buffers 206 (such as first-in-first-out (FIFO) buffers) that buffer data transfers between the various interfaces and provide parallel high-speed data paths therebetween. In one embodiment, the ATA interface 208 supports ATA PIO Mode-4 and a data transfer rate of up to 16.7 MB/second.

The memory controller 102 also includes a local bus interface 212, such as a PCI interface, coupled to the control logic 214, for interfacing the memory controller 102 to the CPU subsystem 112. The CPU subsystem 112 accesses the cache memory 104, non-volatile memory 108, disk interface 116, and host interface 118 via the PCI interface 212.

The memory controller 102 also includes control and status registers (CSRs) 202, coupled to the local bus interface 212 and to the control logic 214. The CSRs 202 are programmable by the CPU subsystem 112 of FIG. 1 to control the memory controller 102 and are readable by the CPU subsystem 112 for the memory controller 102 to provide status to the CPU subsystem 112. Among the CSRs 202 are control registers that enable the CPU subsystem 112 to specify the location and size of one or more regions of data, such as posted-write data, in the cache memory 104 which the memory controller 102 is to flush to the non-volatile memory 108 when main power is lost. The CSRs 202 are described in detail below with respect to FIG. 3.

Referring now to FIG. 3, a block diagram illustrating the CSRs 202 of FIG. 2 according to the present invention is shown. The various CSRs 202 and their contents are described in the text and Tables below.

The NVB_FLUSH_CTRL Register 302 provides the CPU subsystem 112 the ability to initiate a flush operation similar to the ability of the power manager 132 to initiate a flush operation via the pwr_state signal 222, and provides the CPU subsystem 112 the ability to read the status of a flush operation similar to the ability of the power manager 132 to read the flush operation status via the flush_status signal 224. When main power is restored and the CPU subsystem 112 software boots, a flush operation may still be in progress and the cache memory 104 contents may still be valid. Consequently, in one embodiment, the CPU subsystem 112 may command the memory controller 102 to abort an in-progress flush operation (since the cache memory 104 contents may still be valid) by writing a 0 to the FLUSH_START bit in the NVB_FLUSH_CTRL Register 302 as described in Table 3.

TABLE 3

NVB_FLUSH_CTRL Register

| Bits | R/W | Reset | Name | Description |
|---|---|---|---|---|
| 31:4 | RO | 0 | | Reserved |
| 3 | RO | | AUTO_START | 0 if Flush operation initiated by SW<br>1 if Flush operation initiated by HW (pin)<br>This bit is set when a flush is started and will remain set until a new flush is initiated. |
| 2:1 | RO | 0 | FLUSH_STATUS | Provides status of data flush operation.<br>00—No Data Flush<br>01—Data Flush in-progress |

TABLE 3-continued

NVB_FLUSH_CTRL Register

| Bits | R/W | Reset | Name | Description |
|---|---|---|---|---|
| 0 | RW | 0 | FLUSH_START | 10—Data Flush Completed with Errors (ECC, ATA, or Aborted) 11—Data Flush Completed Successfully Writing "1" to this register initiates data flush operation. The external PWR_STATE pins will also set this bit. When the flush is complete, this bit will reset back to 0. Writing "0" while the flush is going aborts the operation (aborts on next 512 byte boundary). After an abort the ATA device may need to be reset as it is left in an unknown state. |

The NVB_RESTORE_CTRL Register 304 provides the CPU subsystem 112 the ability to initiate a restore operation from non-volatile memory 108 to cache memory 104, and provides the CPU subsystem 112 the ability to read the status of a restore operation.

TABLE 4

NVB_RESTORE_CTRL Register

| Bits | R/W | Reset | Name | Description |
|---|---|---|---|---|
| 31:3 | RO | 0 | | Reserved |
| 2:1 | RO | 0 | RESTORE_STATUS | Provides status of data restore operation. 00—No Restore in progress 01—Data Restore in progress 10—Data Restore Completed with Errors (ECC, ATA, or Aborted) 11—Data Restore Completed without Errors |
| 0 | RW | 0 | RESTORE_START | Writing "1" to this register initiates data restore operation. When the restore is complete, this bit will reset back to 0. Writing "0" while the restore is going aborts the operation (aborts on next 512 byte boundary). After an abort the ATA device may need to be reset as it is left in an unknown state. |

The NVB_RAM_START_ADDR1 Register 306 specifies the starting address in the cache memory 104 of a first region of data that is the source or sink of a flush or restore operation, respectively.

TABLE 5

NVB_RAM_START_ADDR1 Register

| Bits | R/W | Reset | Name | Description |
|---|---|---|---|---|
| 31 | RO | 0 | | Reserved |
| 30:9 | RW | 0 | NVB_RAM_START_ADDR1 | Starting cache memory address used for a flush or restore operation for Region 1. |
| 8:0 | RO | 0 | | Reserved |

The NVB_ATA_START_ADDR1 Register 308 specifies the starting address in the non-volatile memory 108 of the first region of data that is the sink or source of a flush or restore operation, respectively. In one embodiment, the memory controller 102 converts the non-volatile memory 108 address specified in the NVB_ATA_START_ADDR1 Register 308 to a sector number if the non-volatile memory 108 is a sectored ATA device.

TABLE 6

NVB_ATA_START_ADDR1 Register

| Bits | R/W | Reset | Name | Description |
|---|---|---|---|---|
| 31 | RO | 0 | | Reserved |
| 30:9 | RW | 0 | NVB_ATA_START_ADDR1 | Starting non-volatile memory address used for a flush or restore operation for Region 1. |
| 8:0 | RO | 0 | | Reserved |

The NVB_SIZE1 Register 312 specifies the total size, or length, of the first region of data that is to be copied by a flush or restore operation.

TABLE 7

NVB_SIZE1 Register

| Bits | R/W | Reset | Name | Description |
|---|---|---|---|---|
| 31 | RO | 0 | | Reserved |
| 30:9 | RW | 0 | NVB_SIZE1 | Total size (length) of a flush or restore operation of Region 1. |
| 8:0 | RO | 0 | | Reserved |

The NVB_RAM_START_ADDR2 Register 314 specifies the starting address in the cache memory 104 of a second region of data that is the source or sink of a flush or restore operation, respectively.

TABLE 8

NVB_RAM_START_ADDR2 Register

| Bits | R/W | Reset | Name | Description |
|---|---|---|---|---|
| 31 | RO | 0 | | Reserved |
| 30:9 | RW | 0 | NVB_RAM_START_ADDR2 | Starting cache memory address used for flush or restore operation for Region 2. |
| 8:0 | RO | 0 | | Reserved |

The NVB_ATA_START_ADDR2 Register 316 specifies the starting address in the non-volatile memory 108 of the second region of data that is the sink or source of a flush or restore operation, respectively. In one embodiment, the memory controller 102 converts the non-volatile memory 108 address specified in the NVB_ATA_START_ADDR2 Register 316 to a sector number if the non-volatile memory 108 is a sectored ATA device.

TABLE 9

NVB_ATA_START_ADDR2 Register

| Bits | R/W | Reset | Name | Description |
|---|---|---|---|---|
| 31 | RO | 0 | | Reserved |
| 30:9 | RW | 0 | NVB_ATA_START_ADDR2 | Starting non-volatile memory address used for a flush or restore operation for Region 2. |
| 8:0 | RO | 0 | | Reserved |

The NVB_SIZE2 Register 318 specifies the total size, or length, of the second region of data that is to be copied by a flush or restore operation.

TABLE 10

NVB_SIZE2 Register

| Bits | R/W | Reset | Name | Description |
|---|---|---|---|---|
| 31 | RO | 0 | | Reserved |
| 30:9 | RW | 0 | NVB_SIZE2 | Total size (length) of a flush or restore operation of Region 2. |
| 8:0 | RO | 0 | | Reserved |

The NVB_SECTOR_COUNT Register 322 specifies the number of sectors to use for each write/read command issued by the memory controller 102 to the non-volatile memory 108 ATA device. The NVB_SECTOR_COUNT Register 322 may be used to optimize the speed of the flush and restore operations to and from the non-volatile memory 108 ATA device. The NVB_SECTOR_COUNT Register 322 is used in conjunction with the NVB_SIZE Register 312/318. For example, the CPU subsystem 112 may program the NVB_SIZE Register 312/318 with a value of 256 KB and the NVB_SECTOR_COUNT Register 322 with a value of 32, resulting in the 256 KB of data being written as 16 write commands of 32 sectors (16 KB) each. The NVB_SIZE Register 312/318 must be programmed with a value that is a multiple of the NVB_SECTOR_COUNT Register 322 value.

TABLE 11

NVB_SECTOR_COUNT Register

| Bits | R/W | Reset | Name | Description |
|---|---|---|---|---|
| 31:9 | RO | 0 | | Reserved |
| 8:0 | RW | 1 | NVB_SECTOR_COUNT | Non-volatile memory Sector Count. Number of sectors to use for each Write/Read command issued to ATA device. The allowable values are:<br>0x000 1 sector<br>0x001 1 sector<br>0x002 2 sectors<br>0x004 4 sectors<br>0x008 8 sectors<br>0x010 16 sectors<br>0x020 32 sectors<br>0x040 64 sectors<br>0x080 128 sectors<br>0x100 256 sectors |

The NVB_PROGRESS Register 324 specifies the current address in the cache memory 104 being read from or written to during a flush operation or restore operation, respectively. The NVB_PROGRESS Register 324 is valid only when a flush or restore operation is in progress. The NVB_PROGRESS Register 324 enables the CPU subsystem 112 to assess the progress of a flush or restore operation. If the flush or restore operation generates an error, the NVB_PROGRESS Register 324 value specifies the approximate address where the error occurred. If a flush or restore operation is aborted, the NVB_PROGRESS Register 324 will have incremented to the next sector after the abort occurs.

TABLE 12

NVB_PROGRESS Register

| Bits | R/W | Reset | Name | Description |
|---|---|---|---|---|
| 31 | RO | 0 | | Reserved |
| 30:4 | RO | 0 | NVB_PROGRESS | Current non-volatile memory flush or Restore Address. This value is only valid during a flush or restore operation. |
| 3:0 | RO | 0 | | Reserved |

The ATA_INT_STATUS Register 326 may be read by the CPU subsystem 112 to determine whether the non-volatile memory 108 ATA device has generated an interrupt, such as upon the successful read or write of one or more sectors of data during a flush or restore operation, and to determine whether a flush or restore operation has completed. The ATA_INT_STATUS Register 326 also enables the CPU subsystem 112 to clear the interrupt source.

TABLE 13

ATA_INT_STATUS Register

| Bits | R/W | Reset | Name | Description |
|---|---|---|---|---|
| 31:3 | RO | 0 | | Reserved |
| 2 | RO | 0 | ATA_DEVICE_INT | ATA Device Interrupt. This bit reflects the status of the non-volatile memory ATA device interrupt line (1 = asserted). |
| 1 | RW1C | 0 | RESTORE_DONE_INT | Restore Operation Done. This bit will be set to one when a Restore operation com- |

TABLE 13-continued

ATA_INT_STATUS Register

| Bits | R/W | Reset | Name | Description |
|---|---|---|---|---|
| | | | | pletes. If the corresponding bit in the ATA_INT_ENABLE register is also set, then an ATA_IRQ will be generated. Writing a one to this bit location will clear the bit (and interrupt) as will starting a new Restore operation. |
| 0 | RW1C | 0 | FLUSH_DONE_INT | Flush Operation Done. This bit will be set to one when a flush operation completes. If the corresponding bit in the ATA_INT_ENABLE register is also set, then an ATA_IRQ will be generated. Writing a one to this bit location will clear the bit (and interrupt) as will starting a new flush operation. |

The ATA_INT_ENABLE Register 328 enables the CPU subsystem 112 to enable or disable interrupt sources specified by the ATA_INT_STATUS Register 326.

TABLE 14

ATA_INT_ENABLE Register

| Bits | R/W | Reset | Name | Description |
|---|---|---|---|---|
| 31:3 | RO | 0 | | Reserved |
| 2 | RW | 0 | ATA_DEVICE_INT_EN | ATA Device Interrupt Enable. When set to one, the ATA Device interrupt will generate an ATA_IRQ interrupt. |
| 1 | RW | 0 | RESTORE_DONE_INT_EN | Restore Operation Done Interrupt Enable. When set to one, the Restore Done interrupt will generate an ATA_IRQ interrupt |
| 0 | RW | 0 | FLUSH_DONE_INT_EN | Flush Operation Done Interrupt Enable. When set to one, the Flush Done interrupt will generate an ATA_IRQ interrupt |

The NVB_ERROR_CODE Register 332 specifies the error type when a flush or restore operation completes if the NVB_FLUSH_CTRL Register 302 or NVB_RESTORE_CTRL Register 304 indicates a failure. When an ECC error is detected, the operation terminates at the next sector boundary. Consequently, up to 512 bytes may be transferred after the error occurs. In one embodiment, the CPU subsystem 112 has the ability to cause ECC errors to be ignored. Hardware detection of ATA device errors is performed by checking the contents of the ATA Device Status register, which is a Task File register in the ATA Direct Access Registers 342 discussed below. The memory controller 102 reads the ATA Device Status register after issuing the ATA command and after the transfer of each sector completes. Consequently, ATA device errors are detected and reported at the sector boundary where the error occurs, i.e., up to 512 bytes may transfer after the ATA error actually occurs. Likewise, ATA operations terminate only at a sector boundary.

TABLE 15

NVB_ERROR_CODE Register

| Bits | R/W | Reset | Name | Description |
|---|---|---|---|---|
| 31:9 | RO | 0 | | Reserved |
| 8 | RO | 0 | NVB_ERROR_TYPE | 0 = ATA Device Error (or no error if no failure) 1 = DDR SDRAM uncorrectable error |
| 7:0 | RO | 0 | ATA_ERROR_CODE | ATA device status register Bit 7: BUSY Bit 6: RDY Bit 5: DWF-Write Fault occurred Bit 4: DSC Bit 3: DRQ Bit 2: CORR Bit 1: IDX (always 0) |

TABLE 15-continued

NVB_ERROR_CODE Register

| Bits | R/W | Reset | Name | Description |
|------|-----|-------|------|-------------|
|      |     |       |      | Bit 0: ERR-Command ended in error specified in ATA Device Error Task File register |

The NVB_CONFIG Register 334 enables the CPU subsystem 112 to configure aspects of a flush operation. In particular, the CPU subsystem 112 may enable the memory controller 102 to automatically perform a flush operation or may disable the memory controller 102 from automatically performing a flush operation. Additionally, the CPU subsystem 112 may selectively instruct the memory controller 102 via the NVB_CONFIG Register 334 to write to the non-volatile memory 108 information specifying the results of a flush operation when the flush operation ends, whether the flush was successful or was aborted or an error occurred, as described below. The memory controller 102 writes the flush results information to a predetermined flush results sector of the non-volatile memory 108 ATA device. In one embodiment, the flush results sector is the first sector of the non-volatile memory 108.

TABLE 16

NVB_CONFIG Register

| Bits | R/W | Reset | Name | Description |
|------|-----|-------|------|-------------|
| 31:2 | RO  | 0     |      | Reserved |
| 1    | R/W | 0     | WR_FLUSH_RESULTS_EN | Enable bit to allow the results of the Flush Operation to be written back to the first sector of the NVB memory. See below for format. |
| 0    | R/W | 0     | AUTO_FLUSH_EN | Enable bit for the Automatic Flush on power-down. 1 = enabled. 0 = disabled. If enabled, when an auto flush operation completes (success, fail or aborted), this bit will be cleared. |

The ATA_RESET Register 336 enables the CPU subsystem 112 to reset the non-volatile memory 108 ATA device.

TABLE 17

ATA_RESET Register

| Bits | R/W | Reset | Name | Description |
|------|-----|-------|------|-------------|
| 31:1 | RO  | 0     |      | Reserved |
| 0    | R/W | 0     | ATA_RESET | When this bit is 1 the ATA device will be held in reset. 0 allows normal operation. |

The ATA_CRC Register 338 contains the 32-bit CRC for the data when a flush or restore operation is completed. The CRC data is automatically written to the write results sector if the option is enabled. In one embodiment, a flush operation writes the CRC value to the write results sector and when a restore operation is performed, the CRC value is compared to the ATA_CRC Register 338 value to determine if any data corruption occurred during the flush or restore operation, indicated by a mismatch.

TABLE 18

ATA_CRC Register

| Bits | R/W | Reset | Name | Description |
|------|-----|-------|------|-------------|
| 31:0 | RO  | 0xFFFFFFFF | ATA_CRC | CRC of the last Flush or Restore operation. The CRC is a 32 bit CRC using 16 bit input. The starting value is 0xFFFFFFFF (preset). The polynomial is: $x^{32} + x^{26} + x^{23} + x^{22} + x^{16} + x^{12} + x^{11} + x^{10} + x^{8} + x^{7} + x^{5} + x^{4} + x^{2} + x + 1$ (IEEE 802.3 CRC-32 polynomial) however, the final result is not complemented. |

The format of the flush results information written to the non-volatile memory 108 ATA device flush results sector is described in Table 19 below.

TABLE 19

Flush Results Sector Format

| Byte Offset | Name | Value |
|-------------|------|-------|
| 0  | Completion Signature | 0x13AC |
| 2  | Completion Status | 0x0002 (if completion with errors or aborted) 0x0003 (if successful completion) |
| 4  | Completion Error Code | Same value as NVB_ERROR_CODE Register |
| 6  | High Half of CRC | 0xXXXX |
| 8  | Low Half of CRC | 0xXXXX |
| 10 | Reserved | 0x00000000 |
| 14 | Sector Pad Bytes | 0xFF (remainder of sector has this value) |

The Completion Signature value is also stored in the code FLASH 106 so that the CPU subsystem 112 can compare it with the Completion Signature in the non-volatile memory 108 flush results sector to determine whether a flush operation was successful. Additionally, in one embodiment, the memory controller 102 computes a running cyclic redundancy code (CRC) of the data as it flushes the data to the non-volatile memory 108, and writes the final CRC value to the flush results sector at the offset shown in Table 19. This enables the CPU subsystem 112 to generate a CRC when reading the data during a restore operation to verify that the data is valid, i.e., that the data was accurately written to the non-volatile memory 108 by the flush operation, by comparing with the ATA_CRC Register 338 value.

The ATA Direct Access Registers 342 comprise control and status registers used by the CPU subsystem 112 to communicate with the non-volatile memory 108 ATA device. In one embodiment, the ATA Direct Access Registers 342 comprise a standard ATA register file, commonly known as a Task File, which is well-known in the art of disk drives. The memory controller 102 reads and writes the ATA Direct Access Registers 342 to perform ATA commands with the non-volatile memory 108 ATA device, such as writes of posted-write data during a flush operation and reads of the data during a restore operation. The CPU subsystem 112 may also directly access the ATA Direct Access Registers 342.

Figure 4:
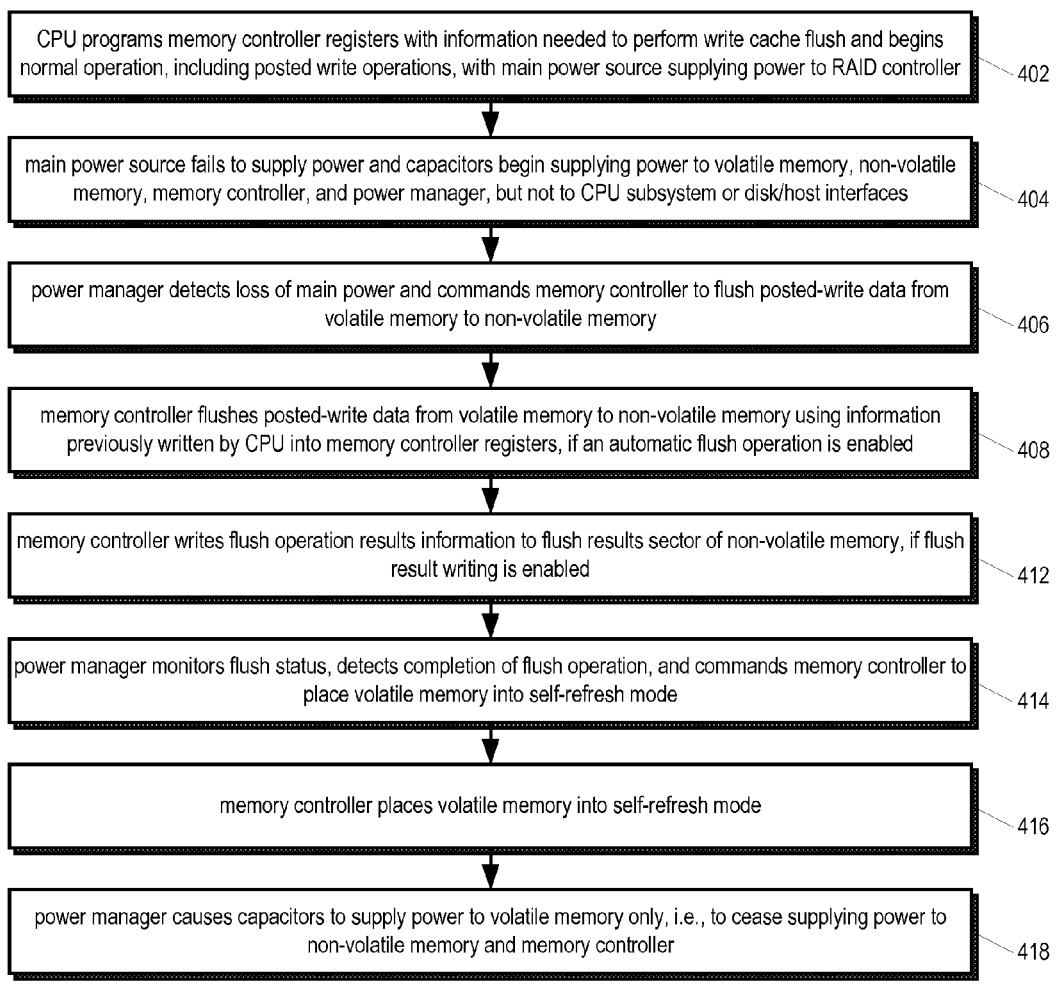
FIG. 4 is a flowchart illustrating operation of the RAID controller of FIG. 1 to perform a flush operation according to the present invention.

Referring now to FIG. 4, a flowchart illustrating operation of the RAID controller 100 of FIG. 1 to perform a flush operation according to the present invention is shown. Flow begins at block 402.

At block 402, the CPU subsystem 112 programs the memory controller 102 CSRs 202 of FIG. 3 with the information needed by the memory controller 102 to perform an automatic flush operation. Preferably, the CPU subsystem 112 software performs this function as part of its initialization sequence during boot up. However, in conjunction with the dynamic write cache size embodiments described herein, the CPU 112 may also program the memory controller 102 CSRs 202 after boot time during normal operation of the RAID controller 100 with updated information in response to a write cache size adjustment. In particular, the CPU subsystem 112 programs the NVB_FLUSH_CTRL Register 302, the NVB_RAM_START_ADDR1 Register 306, the NVB_ATA_START_ADDR1 Register 308, the NVB_SIZE1 Register 312, the NVB_RAM_START_ADDR2 Register 314, the NVB_ATA_START_ADDR2 Register 316, the NVB_SIZE2 Register 318, the NVB_SECTOR_COUNT Register 322, the ATA_INT_ENABLE Register 328, and the NVB_CONFIG Register 334 with the desired values to provide the memory controller 102 with the necessary information to perform a flush operation. In one embodiment, the CPU subsystem 112 programs the memory controller 102 to flush all cached data, i.e., posted-write data and read-cached data; however, in another embodiment, the CPU subsystem 112 programs the memory controller 102 to include only posted-write data, thereby reducing the amount of energy and time required to perform the flush operation. In addition, the CPU subsystem 112 may initialize the flush results sector to a predetermined value in order to enable the CPU subsystem 112 to determine whether the memory controller 102 successfully wrote the flush operation results information to the flush results sector at the end of a flush operation. For example, in one embodiment, the CPU subsystem 112 writes or erases the flush results sector with a value of 0xFF for each byte in the sector. The CPU subsystem 112 subsequently begins normal operation while the main power source supplies power to the RAID controller 100. Normal operation includes performing posted write operations, causing posted-write data to be stored into the volatile cache memory 104. Flow proceeds to block 404.

At block 404, the main power source fails to supply power to the RAID controller 100. In response, the capacitors 136 begin supplying power to the predetermined portions of the RAID controller 100, namely to the cache memory 104, the non-volatile memory 108, the memory controller 102, the power manager 132, and power regulator 134 and related circuitry. In particular, the capacitors 136 do not supply power to the CPU subsystem 112, disk interface 116, or host interface 118. Additionally, the PCI-X interfaces 216 and 218 and FIFOs 206 that are not needed because they are used only to interface with the disk interface 116 and host interface 118 are not powered by the capacitors 136. Consequently, advantageously, the CPU subsystem 112, disk interface 116, host interface 118 and unneeded portions of the memory controller 102 do not consume energy during the flush operation, thereby enabling the RAID controller 100 to employ capacitors 136 capable of storing less energy, which typically implies capacitors 136 that are less expensive and/or require less space. Additionally, the fact that the CPU subsystem 112, disk interface 116, and host interface 118 do not consume energy stored in the capacitors 136 leaves more energy stored in the capacitors 136 once the flush operation is complete, which increases the likelihood that the capacitors 136 will continue to supply power to the cache memory 104 after the flush is complete thereby keeping the posted-write data intact, which may alleviate the need for a restore operation when the main power is restored, as described below. Flow proceeds to block 406.

At block 406, the power manager 132 detects the loss of main power and commands the memory controller 102 via the pwr_state signal 222 to begin a flush operation of data from the cache memory 104 to the non-volatile memory 108. Flow proceeds to block 408.

At block 408, if the AUTO_FLUSH_EN bit in the NVB_CONFIG Register 334 is set, then the memory controller 102 performs a flush operation based on the information previously programmed into the CSRs 202 at block 402. In particular, the memory controller 102 copies the data in the two regions specified by the NVB_RAM_START_ADDR1 Register 306/NVB_SIZE1 Register 312 and NVB_RAM_START_ADDR2 Register 314/NVB_SIZE2 Register 318 to the two locations in the non-volatile memory 108 specified by the NVB_ATA_START_ADDR1 Register 308 and NVB_ATA_START_ADDR2 Register 316, respectively, in a manner specified by the NVB_SECTOR_COUNT Register 322 and the ATA_INT_ENABLE Register 328. In one embodiment, the first region includes the portion of the posted-write data that includes the actual user data, and the second region includes the portion of the posted-write data that is metadata. In another embodiment, the first region includes the posted-write user data and associated metadata, and the second region includes read-cached user data and associated metadata. However, the use of the two regions is not limited to these embodiments. Furthermore, embodiments are contemplated in which the CSRs 202 include registers for specifying more or less than two data regions. Flow proceeds to block 412.

At block 412, if the WR_FLUSH_RESULTS_EN bit in the NVB_CONFIG Register 334 is set, then the memory controller 102 writes the flush results information specified in Table 19 above to the flush results sector of the non-volatile memory 108 at the end of the flush operation, whether the flush operation was successful, was aborted, or was terminated due to an error. If the CPU subsystem 112 aborts a flush (or restore) operation, or if the memory controller 102 detects an ECC or ATA error during the flush (or restore) operation, then the memory controller 102 will terminate the flush (or restore) operation at the next sector boundary. If the WR_FLUSH_RESULTS_EN bit in the NVB_CONFIG Register 334 is set, the memory controller 102 will write the flush results sector and post a Boolean 10 on the flush_status signal 224 and in the FLUSH_STATUS bits of the NVB_FLUSH_CTRL Register 302. If, while the memory controller 102 is writing the flush operation results to the flush results sector itself, the CPU subsystem 112 commands an abort or the memory controller 102 detects an error, the flush operation results may or may not be written successfully to the flush results sector, and if they are written, the flush results information may be unreliable. Flow proceeds to block 414.

At block 414, after the power manager 132 commands the memory controller 102 to initiate the flush operation, the power manager 132 monitors the progress of the flush operation via the flush_status signal 224. When the flush operation completes, the power manager 132 commands the memory controller 102 via the pwr_state signal 222 to place the cache memory 104 into self-refresh mode, in order to reduce the amount of energy stored in the capacitors 136 that is consumed by the cache memory 104. Flow proceeds to block 416.

At block 416, the memory controller 102 places the cache memory 104 into self-refresh mode in response to the command performed by the power manager 132 at block 414. Flow proceeds to block 418.

At block 418, the power manager 132 causes the capacitors 136 to supply power to the cache memory 104 only. That is, the power manager 132 causes the capacitors 136 to no longer supply power to the non-volatile memory 108 and the memory controller 102, in order to reduce the amount of energy stored in the capacitors 136 that is consumed while waiting until main power is restored. Flow ends at block 418.

Figure 5:
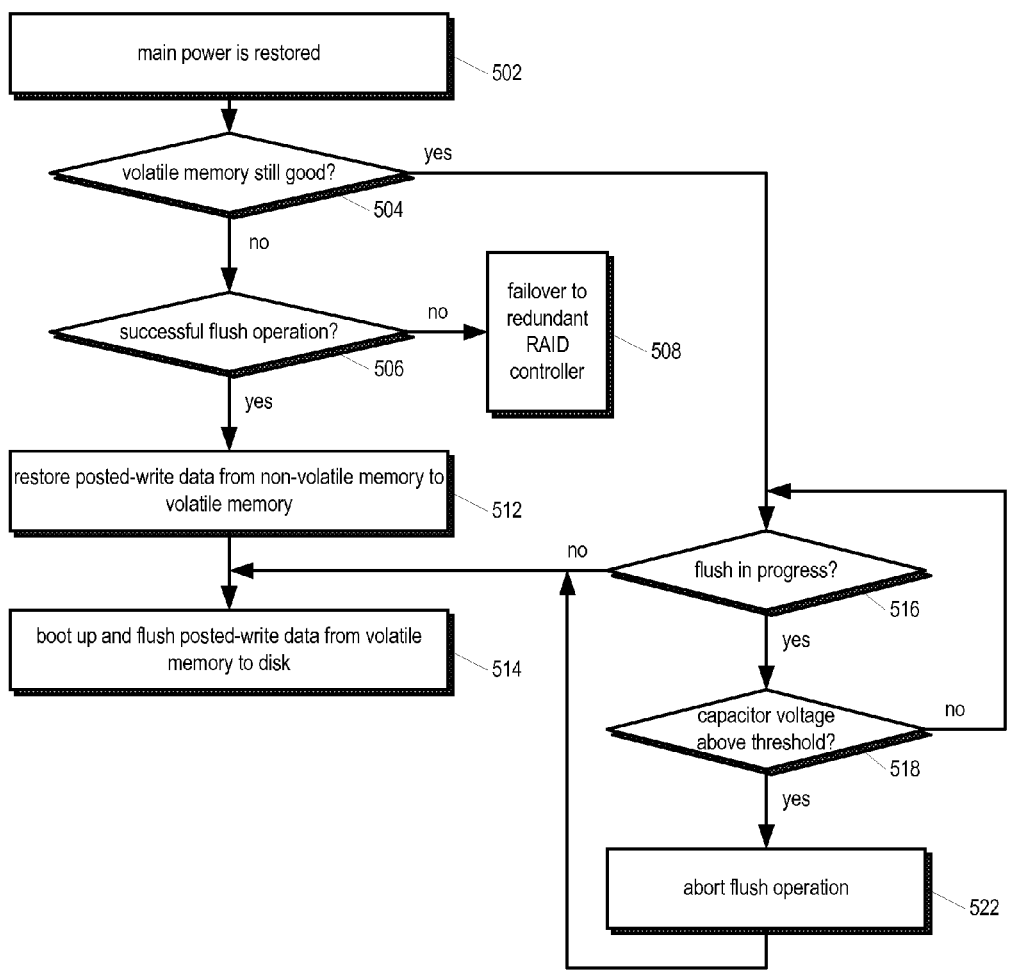
FIG. 5 is a flowchart illustrating operation of the RAID controller of FIG. 1 in response to main power being restored after a failure of main power according to the present invention.

Referring now to FIG. 5, a flowchart illustrating operation of the RAID controller 100 of FIG. 1 in response to main power being restored after a failure of main power according to the present invention is shown. Flow begins at block 502.

At block 502, the main power source resumes supplying power to the RAID controller 100. Consequently, the CPU subsystem 112 software boots up and begins its initialization sequence. Flow proceeds to decision block 504.

At decision block 504, the CPU subsystem 112 determines whether the cache memory 104 contents is still valid. In one embodiment, the CPU subsystem 112 determines whether the cache memory 104 contents is still valid by examining a data good indicator in the power manager 132 that may be written by the memory controller 102. The power manager 132 is configured such that when it is powered up, the data good indicator resets to a predetermined value, such as a Boolean value of zero. Furthermore, the power-off threshold of the power manager 132 is at least as high as the power threshold at which the cache memory 104 begins to lose its data. When main power is lost, the memory controller 102 writes a value into the data good indicator different from the power-up reset value. Thus, if the capacitors 136 fail to supply power to the cache memory 104 (and therefore also fail to supply power to the data good indicator), when main power is restored, the CPU subsystem 112 will read the power-up reset value from the data good indicator rather than the value written by the memory controller 102. Consequently, the CPU subsystem 112 will determine that the cache memory 104 must be restored from the non-volatile memory 108, if the flush operation was successful. However, if the CPU subsystem 112 reads from the data good indicator the value written by the memory controller 102, then the CPU subsystem 112 will determine that it can forego restoring the cache memory 104 thereby making the user data available to the host computers sooner. If the cache memory 104 contents is still valid, flow proceeds to decision block 516; otherwise, flow proceeds to decision block 506.

At decision block 506, the CPU subsystem 112 determines whether a flush operation performed according to FIG. 4 was successfully completed by examining the FLUSH_STATUS bits of the NVB_FLUSH_CTRL Register 302. In one embodiment, the CPU subsystem 112 additionally determines whether the flush operation completed successfully by examining the Completion Status in the flush results sector. In one embodiment, the CPU subsystem 112 additionally determines whether the flush operation completed successfully by comparing the Completion Signature in the flush results sector with the Completion Signature in the code FLASH 106. In one embodiment, the CPU subsystem 112 additionally determines whether the flush operation completed successfully by comparing the CRC in the flush results sector with the CRC computed by reading the data from the non-volatile memory 108. If the flush operation completed successfully, flow proceeds to block 512; otherwise, flow proceeds to block 508.

At block 508, since the posted-write data has been lost, the RAID controller 100 fails over to the partner, i.e., redundant, RAID controller 100 in the system. In one embodiment, during normal operation when a host issues a write I/O request to the RAID controller 100, the posted write data is also written to the partner RAID controller 100. Consequently, if one of the RAID controllers 100 fails, in particular if a flush operation fails on one RAID controller 100, there is a high probability that the flush operation succeeded on the partner RAID controller 100. If so, the partner RAID controller 100 can perform a restore of the posted-write data from its non-volatile memory 108 to the cache memory 104 and subsequently flush the posted-write data to disk. Flow ends at block 508.

At block 512, the CPU subsystem 112 commands the memory controller 102 to perform a restore operation to restore the data flushed from the cache memory 104 to the non-volatile memory 108 during the flush operation described in FIG. 4 back to the cache memory 104. Prior to commanding the memory controller 102 to perform the restore operation, the CPU subsystem 112 programs the appropriate values into the various CSRs 202 of the memory controller 102 needed to perform the restore operation. In one embodiment, the CPU subsystem 112 performs the restore operation, rather than commanding the memory controller 102 to perform the restore operation, by simply reading data from the non-volatile memory 108 and writing the data to the cache memory 104. Because the restore operation is performed while the main power source is supplying power, it is not as crucial that the memory controller 102 perform the restore operation at a lower power consumption level. However, this embodiment has the disadvantage that the CPU subsystem 112 may take longer than the memory controller 102 to complete the restore operation. Flow proceeds to block 514.

At block 514, the CPU subsystem 112 flushes the posted-write data from the cache memory 104 to disk. Flow ends at block 514.

At decision block 516, the CPU subsystem 112 determines whether a flush operation is in progress by reading the FLUSH_STATUS bits of the NVB_FLUSH_CTRL Register 302. If a flush operation is in progress, flow proceeds to decision block 518; otherwise, flow proceeds to block 514.

At decision block 518, the CPU subsystem 112 examines the capacitors 136 voltage level to determine whether the voltage level is above a minimum threshold. In one embodiment, the minimum voltage threshold value is programmed into the CPU subsystem 112 software. In another embodiment, the minimum voltage threshold value is user-programmable via a user configuration program. If the capacitors 136 voltage level is above the minimum threshold, flow returns to decision block 516 to wait until either the flush operation completes or the capacitors 136 voltage reaches the minimum threshold; otherwise, flow proceeds to block 522.

At block 522, the CPU subsystem 112 aborts the flush operation by writing a Boolean 0 to the FLUSH_START bit in the NVB_FLUSH_CTRL Register 302. Flow proceeds to block 514.

The process of waiting to boot the RAID controller 100 and resume normal operations if the cache memory 104 is still good and a flush operation is in progress until either the flush completes or the capacitors 136 voltage level reaches the minimum threshold solves the problem which might exist without the benefit of the additional test at decision block 518, as exemplified by the following sequence of events. Assume the power manager 132 senses the loss of main power and commands the memory controller 102 to perform a flush operation. A significant amount of the capacitors 136 stored energy is consumed by the flush operation. Before the flush operation completes, main power is restored; consequently, the CPU subsystem 112 aborts the flush operation. The CPU subsystem 112 boots up and enables another flush operation in the event of another main power loss. Shortly thereafter, and significantly, while the capacitors 136 are less than fully re-charged, the power manager 132 senses another loss of main power and commands the memory controller 102 to perform another flush operation. The second flush operation consumes again a significant amount of the capacitors 136 stored energy, which began with less than a full charge. If this sequence continues, eventually the capacitors 136 will not have enough energy to complete a successful flush operation, resulting in potential loss of user data. The scenario described above may be induced by periodic brown-outs of the main power supply or possibly by a noisy power supply that cause the power manager 132 to sense that main power is being lost in a relatively periodic fashion in which the period is on the order of the flush operation time. However, advantageously, the additional test at decision block 518 potentially avoids this problem. In an alternate embodiment, the write cache 156 is placed in write-through mode since the capacitor pack 136 is not fully charged thereby avoiding the undesirable scenario. In another alternate embodiment, at block 518 the CPU 112 determines whether the flush operation is complete and if so flow proceeds to block 514; otherwise, flow returns to block 516.

Figure 6:
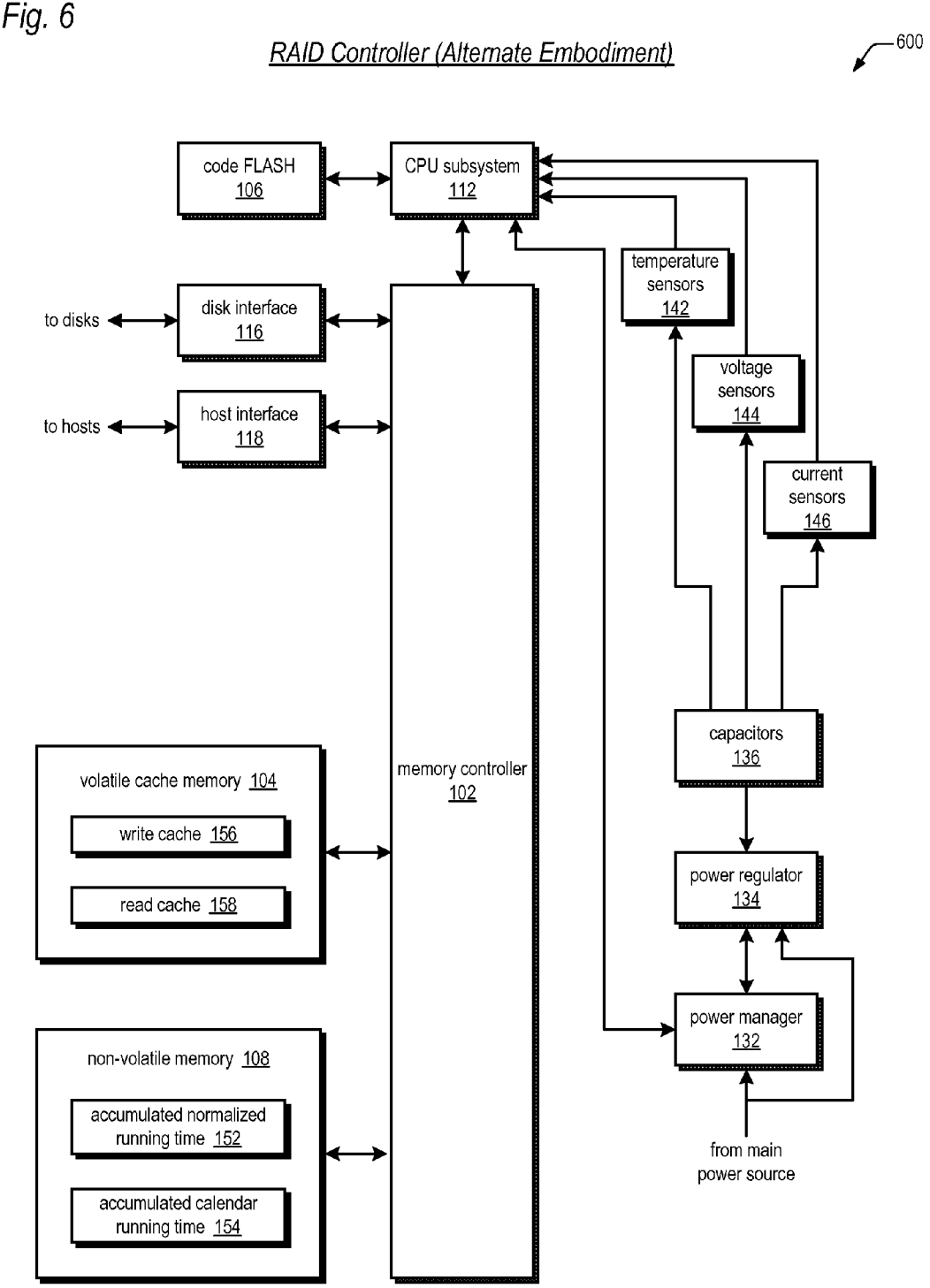
FIG. 6 is a block diagram illustrating a RAID controller according to an alternate embodiment of the present invention.
Figure 7:
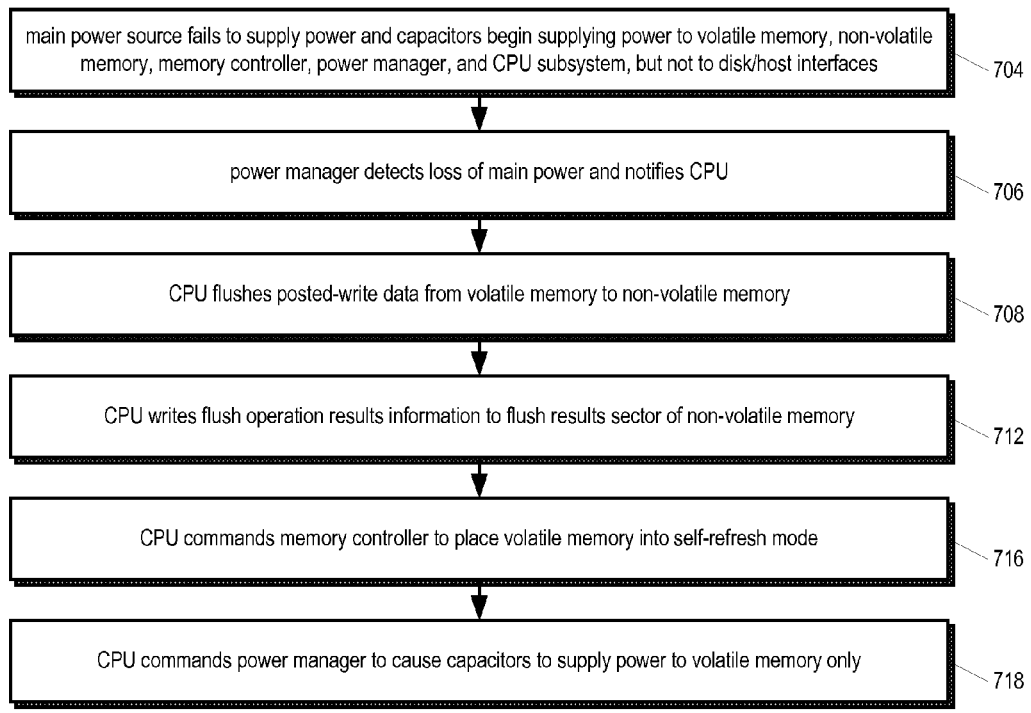
FIG. 7 is a flowchart illustrating operation of the RAID controller of FIG. 6 to perform a flush operation according to an alternate embodiment of the present invention.

Although embodiments have been described in which the memory controller is employed to perform the posted-write data flush from volatile memory to non-volatile memory, embodiments are contemplated in which the CPU performs the flush from volatile memory to non-volatile memory, as illustrated in FIGS. 6 and 7. The embodiment of FIGS. 6 and 7 which use the CPU subsystem 112 to perform the flush operation may be a viable embodiment if one or more of the following in combination is true: the energy density of the capacitors 136 is sufficiently high to store the energy needed by the RAID controller 100, including the CPU subsystem 112, to perform the flush operation; the available space allocated for the capacitors 136 on the RAID controller 100 is sufficiently great to use enough capacitors 136 to store the energy needed by the RAID controller 100, including the CPU subsystem 112, to perform the flush operation; the CPU subsystem 112 consumes a small enough amount of power such that the capacitors 136 can store the energy needed by the RAID controller 100, including the CPU subsystem 112, to perform the flush operation. Although this embodiment may consume more energy than the embodiments described in FIGS. 1 through 5, if the capacitors 136 are able to supply the required energy, then the RAID controller 100 would enjoy the benefits of capacitor technology over battery technology described herein, such as lower cost, higher reliability, less maintenance, and shorter re-charge time.

Referring now to FIG. 6, a block diagram illustrating a RAID controller 600 according to an alternate embodiment of the present invention is shown. The RAID controller 600 of FIG. 6 is similar to the RAID controller 100 of FIG. 1; however, the power manager 132 is coupled to communicate with the CPU subsystem 112 with respect to flush operations rather than to the memory controller 102, as shown, and as described with respect to FIG. 7.

Referring now to FIG. 7, a flowchart illustrating operation of the RAID controller 600 of FIG. 6 to perform a flush operation according to an alternate embodiment of the present invention is shown. Flow begins at block 704.

At block 704, the main power source fails to supply power to the RAID controller 600. In response, the capacitors 136 begin supplying power to the predetermined portions of the RAID controller 600, namely to the cache memory 104, the non-volatile memory 108, the memory controller 102, the power manager 132, power regulator 134, CPU subsystem 112, and related circuitry. In particular, the capacitors 136 do not supply power to the disk interface 116, or host interface 118. Additionally, the PCI-X interfaces 216 and 218 and FIFOs 206 that are not needed because they are used only to interface with the disk interface 116 and host interface 118 are not powered by the capacitors 136. Consequently, advantageously, the disk interface 116, host interface 118 and unneeded portions of the memory controller 102 do not consume energy during the flush operation, thereby enabling the RAID controller 100 to employ capacitors 136 capable of storing less energy, which typically implies capacitors 136 that are less expensive and/or require less space. Additionally, the fact that the disk interface 116 and host interface 118 do not consume energy stored in the capacitors 136 leaves more energy stored in the capacitors 136 once the flush operation is complete, which increases the likelihood that the capacitors 136 will continue to supply power to the cache memory 104 after the flush is complete thereby keeping the posted-write data intact, which may alleviate the need for a restore operation when the main power is restored, as described below. Flow proceeds to block 706.

At block 706, the power manager 132 detects the loss of main power and notifies the CPU subsystem 112 that a flush operation of data from the cache memory 104 to the non-volatile memory 108 is needed. Flow proceeds to block 708.

At block 708, the CPU subsystem 112 performs a flush operation by copying the data from the cache memory 104 to the non-volatile memory 108. Flow proceeds to block 712.

At block 712, the CPU subsystem 112 writes the flush results information specified in Table 19 above to the flush results sector of the non-volatile memory 108 upon completion of the flush operation, whether the flush operation was successful, was aborted, or was terminated due to an error. Flow proceeds to block 716.

At block 716, the CPU subsystem 112 places the cache memory 104 into self-refresh mode. Flow proceeds to block 718.

At block 718, the CPU subsystem 112 commands the power manager 132 to cause the capacitors 136 to supply power to the cache memory 104 only. That is, the power manager 132 causes the capacitors 136 to no longer supply power to the CPU subsystem 112, non-volatile memory 108 and the memory controller 102, in order to reduce the amount of energy stored in the capacitors 136 that is consumed while waiting until main power is restored. Flow ends at block 718.

Referring now to FIG. 8, a block diagram illustrating a table 800, or database 800, for storing lifetimes of the capacitor pack 136 of FIG. 1 for various temperature and voltage combinations according to the present invention is shown. The values indicated in FIG. 8 are hypothetical values provided for illustration purposes, and do not represent actual known values of a particular capacitor product, which may be obtained from the capacitor manufacturer. Furthermore, the range of temperatures shown is a hypothetical range selected for illustration purposes.

As explained above, the purpose of the capacitor pack 136 is to store energy to supply power for backing up, or flushing, the write cache data from the write cache 156 to the non-volatile memory 108 in response to a main power loss. When the capacitor pack 136 no longer has the capacity to store sufficient energy to backup the write cache 156 to the non-volatile memory 108, the capacitor pack 136 has reached its end of life, i.e., its lifetime has expired. The capacitance of the capacitor pack 136 drops over time as the capacitor pack 136 is used in operation of the RAID controller 100. Various factors affect the capacitance drop of the capacitor pack 136, including the temperature, the operating voltage, excessive current draws, and changes in polarity of the capacitor pack 136. In one embodiment, the current draw of the capacitor pack 136 is monitored also, and if the current draw exceeds a predetermined amount, charging of the capacitor pack 136 is temporarily disabled to avoid prematurely reducing the lifetime of the capacitor pack 136, as discussed below. The polarity of the capacitor pack 136 is kept the same during operation of the RAID controller 100 to avoid prematurely reducing the lifetime of the capacitor pack 136. Thus, the primary factors affecting the capacitor pack 136 capacitance, and thus lifetime, are the temperature and operating voltage.

In one embodiment of the RAID controller 100, the warranted lifetime of the capacitor pack 136 is 5 years. That is, the RAID controller 100 manufacturer warrants that the capacitor pack 136 will have sufficient capacitance for at least 5 years to store sufficient energy to backup the write cache 156 to the non-volatile memory 108. The amount of energy each capacitor in the capacitor pack 136 is capable of storing is given by equation (1), where E is the energy stored by the capacitor, C is the capacitance of the capacitor, $V_{op}$ is the operating voltage of the capacitor and $V_{min}$ is the cut-off voltage of the capacitor:

$$E = \frac{1}{2} \cdot C \cdot (V_{op}^2 - V_{min}) \quad (1)$$

In one embodiment, the capacitor pack 136 is arranged as four capacitors in series, each capacitor being of the same type. Thus, the total energy stored by the capacitor pack 136 is the sum of the energy stored by each of the four capacitors in the capacitor pack 136, or approximately four times the energy stored by a single capacitor in the pack. Furthermore, the operating voltage of the capacitor pack 136 is the sum of the operating voltage of the four capacitors in the capacitor pack 136, or approximately four times the operating voltage of a single capacitor in the pack. The RAID controller 100 includes an active balance equalizer circuit that employs a quad operational amplifier circuit to balance the voltage across each capacitor of the capacitor pack 136 to be approximately one-fourth of the total capacitor pack 136 voltage. In one embodiment, it is assumed that the ambient temperature and operating voltage of each of the individual capacitors in the capacitor pack 136 is approximately the same; consequently, the lifetime of each of the individual capacitors is approximately the same. Another embodiment is contemplated in which the lifetime of each individual capacitor in the capacitor pack 136 is calculated based on the temperature and individual voltage readings, and the lifetime of the capacitor with the lowest computed lifetime limits the lifetime of the capacitor pack 136 as a whole.

In one embodiment, the end of life for the capacitor pack 136 is chosen to be the condition when the individual capacitors of the capacitor pack 136 have suffered a 30% capacitance drop from their original capacitance value. In one embodiment, once the 30% capacitance drop is reached, the capacitor pack 136 is no longer capable of storing sufficient energy to perform the backup at the normal operating voltage. In another embodiment, the 30% capacitance drop end of life value is chosen to provide some margin for error; that is, the capacitors in the capacitor pack 136 may actually have to suffer more than the 30% capacitance drop in order to no longer be capable of storing sufficient energy to perform the backup at the normal operating voltage. The 30% capacitance drop value is used herein to illustrate the invention. However, it should be understood that the invention is not limited to a particular capacitance drop value; rather, the invention may be practiced with other capacitance drop values depending upon the amount of energy required to perform the backup and the characteristics of the particular capacitors employed. The lifetime values specified in the table 800 of FIG. 8 indicate the number of hours that an individual capacitor of the capacitor pack 136 may operate at the specified temperature and voltage before reaching its end of life percentage capacitance drop from its original capacitance value. Thus, each lifetime value stored in the table 800 may be understood as specifying a lifetime over which the capacitor pack 136 would have a capacity to store at least a predetermined amount of energy if the capacitor pack 136 were operated at the indexed temperature and voltage during the lifetime specified. In one embodiment, the predetermined amount of energy is the calculated amount of energy required to supply sufficient energy to backup the full size write cache 156 to the non-volatile memory 108.

In one embodiment, the table 800 of FIG. 8 is stored as a two-dimensional array in the code FLASH 106 and copied to the program RAM of the CPU subsystem 112 when the RAID controller 100 is booted so that the CPU 112 can lookup lifetimes in the table 800 using sampled temperature and voltage values. In the embodiment of FIG. 8, the RAID controller 100 supports operating the capacitor pack 136 at two different voltages, 8.2V and 7.2V, as shown in the table 800. In the table 800, the 8.2V operating voltage occupies index 0 of the array, and the 7.2V operating voltage occupies index 1 of the array. Advantageously, described herein is a method for dynamically reducing, or throttling, the operating voltage of the capacitor pack 136 to the lower voltage level if necessary, in order to increase the lifetime of the capacitor pack 136. Although the embodiment of FIG. 8 illustrates only two possible operating voltages, the invention is not limited to two operating voltages; rather, embodiments with a larger number of operating voltages are contemplated. Furthermore, embodiments with operating voltage values other than those illustrated are contemplated. In the exemplary embodiment, four capacitors 136 are arranged in series, and each capacitor 136 operates at approximately 2.05V or 1.8V, depending upon the capacitor pack 136 operating voltage controlled by the CPU 112. The array 800 comprises two columns corresponding to the two voltages. The rows of the array 800 are indexed by the temperature value. Each row corresponds to a different integer degree Celsius value. The table 800 of the embodiment of FIG. 8 includes ambient temperature values from 10 degrees Celsius to 40 degrees Celsius. For example, the lifetime at 40 degrees Celsius and 8.2V (or 2.05V per capacitor) is 800 hours and at 7.2V (or 1.8V per capacitor) is 820 hours, as shown in FIG. 8. In one embodiment, assuming a fixed operating voltage value, the characteristics of the capacitors in the capacitor pack 136 are such that the lifetime values approximate a logarithmic function of the temperature. The CPU 112 uses the sampled temperature and voltage values to index the table 800 to obtain the specified lifetime in order to calculate the accumulated normalized running time 152 and related values, as described below with respect to the remaining Figures.

As discussed above, in one embodiment, the warranted lifetime is 5 years. However, for the sake of discussion with respect to the hypothetical values of table 800, assume a warranted lifetime of 1000 hours. As may be observed from table 800, if the capacitor pack 136 were continuously operated at 8.2V and 25 degrees Celsius, it would have a lifetime of the warranted 1000 hours, i.e., it would reach its end of life percentage capacitance drop (e.g., 30%) after 1000 hours. In contrast, if the capacitor pack 136 was continuously operated at 7.2V and 28 degrees Celsius, it would have a lifetime of the warranted 1000 hours, i.e., it would reach its end of life capacitance drop after 1000 hours. Thus, the "normal" temperature when operating the capacitor pack 136 at 8.2V is 25 degrees, and the "normal" temperature when operating at 7.2V is 28 degrees. That is, the normal temperature, for a given operating voltage, is the temperature at which the capacitor pack 136 lifetime meets the warranted lifetime, or exceeds the warranted lifetime where margin is desired. However, whereas the values of the table 800 may be derived experimentally in laboratory conditions in which the temperature and voltage of the capacitors are maintained at constant values, when the capacitor pack 136 is operating within the RAID controller 100 within a computer system, the temperature will vary from the normal temperature. Similarly, advantageously the operating voltage of the capacitor pack 136 may be purposely dynamically adjusted when necessary in order to increase the lifetime of the capacitor pack 136 to attempt to provide the warranted lifetime, as described below. Thus, advantageously, the present invention describes how the RAID controller 100 normalizes the lifetime values obtained from the table 800 relative to the normal temperature for the particular operating voltage level, as described below with respect to FIG. 9.

In one embodiment, the capacitor pack 136 includes four 50 Farad capacitors in series storing approximately 356 Joules of usable energy when fully charged and at full capacitance, assuming a 2.05V operating voltage of each capacitor and a 0.8V cut-off voltage, which defines the minimum working voltage for reliable FET gate thresholds and low drop out regulation; in contrast, at a 30% capacitance drop, the capacitor pack 136 is capable of storing only 250 Joules. The capacitor pack 136 is capable of storing 260 Joules of usable energy assuming a 1.8V operating voltage of each capacitor; in contrast, at a 30% capacitance drop, the capacitor pack 136 is capable of storing only 182 Joules. In one embodiment, the power consumption of the cache memory 104, non-volatile memory 108, memory controller 102, power manager 132, DDR-SDRAM bus interface termination circuitry, a clocking circuit, and other miscellaneous circuitry requiring power during the flush operation is approximately 4 Watts. The non-volatile memory 108 is capable of being written to at a sustained rate of approximately 10 MB/second. In one embodiment, the size of the cache memory 104 is 1 GB, which comprises approximately 512 MB for a full size write cache 156, and the size of the non-volatile memory 108 is 512 MB. Consequently, the flush operation takes approximately 50 seconds to complete and consumes approximately 200 Joules of energy. Thus, as may be observed, when the capacitor pack 136 is operating at the lower 7.2V level, even before capacitor pack 136 reaches the 30% capacitance drop end of life, the capacitor pack 136 may not be able to store sufficient energy to backup the entire write cache 156. Advantageously, described herein is a method for dynamically reducing the write cache 156 to a size for which the capacitor pack 136 can supply enough energy to perform the backup.

Although embodiments are described herein in which the warranted lifetime is based on a predetermined amount of energy required to perform the write cache 156 to non-volatile memory 108 backup, the capacitor pack 136 lifetime monitoring and dynamic voltage throttling methods described herein are not limited to such an application. Rather other embodiments are contemplated in which the warranted lifetime is based on a predetermined amount of energy required to perform other functions. For example, embodiments are contemplated in which the RAID controller 100 does not include a non-volatile memory 108 for backing up the write cache 156, and the predetermined amount of energy is an amount of energy required to supply power to the volatile memory 104 for a predetermined amount of time, e.g., 3 days, during loss of main power in order to retain the integrity of the data in the write cache 156 until main power can be restored.

Figure 9:
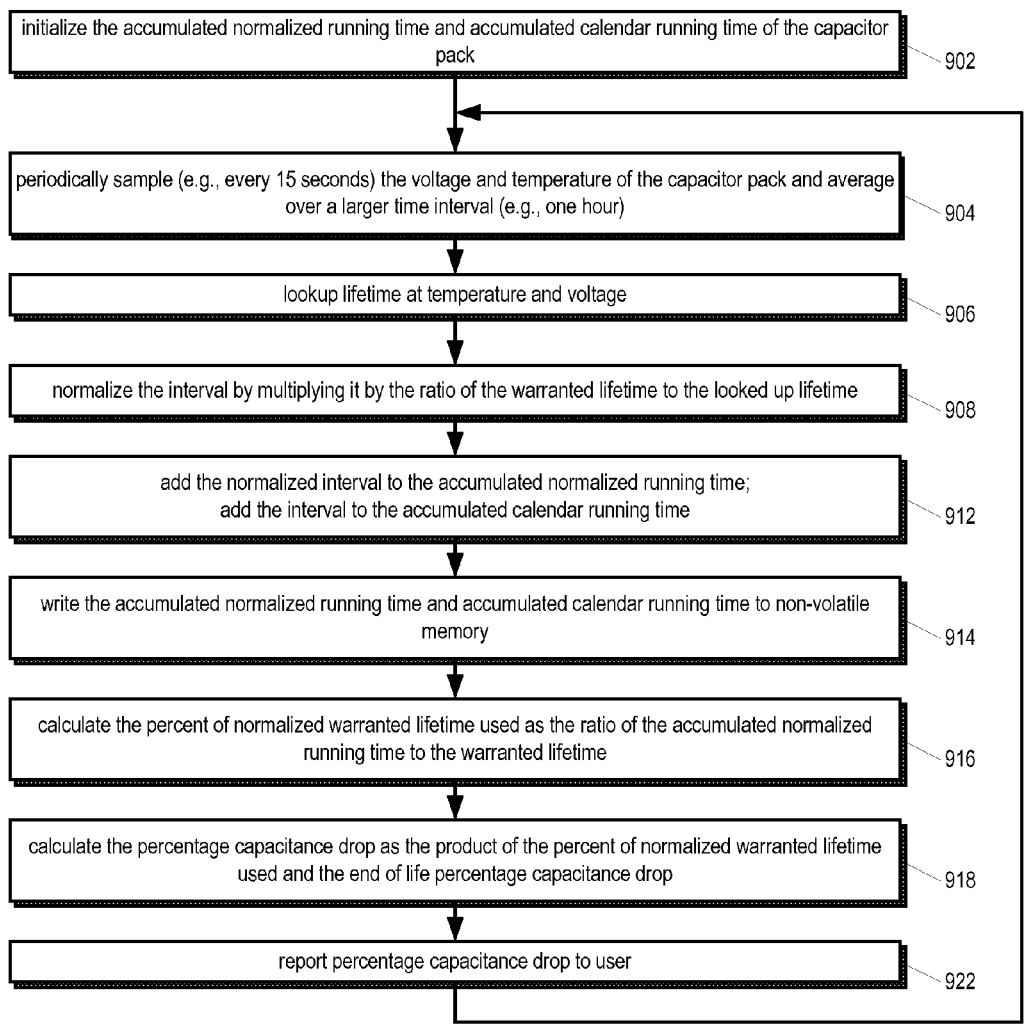
FIG. 9 is a flowchart illustrating operation of the RAID controller of FIG. 1 according to the present invention.

Referring now to FIG. 9, a flowchart illustrating operation of the RAID controller 100 of FIG. 1 according to the present invention is shown. In particular, FIG. 9 illustrates how the RAID controller 100 calculates the accumulated normalized running time 152 of the capacitor pack 136. Flow begins at block 902.

At block 902, the CPU 112 initializes the accumulated normalized running time 152 and accumulated calendar running time 154. In one embodiment, the accumulated normalized running time 152 and accumulated calendar running time 154 are initialized when the RAID controller 100 is manufactured. In one embodiment, the accumulated normalized running time 152 and accumulated calendar running time 154 are initialized to zero. In another embodiment, the accumulated normalized running time 152 and accumulated calendar running time 154 are initialized to an amount of time based on the tolerance factor of the capacitance value of the capacitor pack, such as specified by the manufacturer of the capacitor pack. For example, if the capacitor manufacturer specifies a 10% tolerance, then the accumulated normalized running time 152 and accumulated calendar running time 154 are initialized to 10% of the end of life value, e.g., 10% of 5 years. In another embodiment, the accumulated normalized running time 152 and accumulated calendar running time 154 are initialized to a calendar age, such as the amount of time since the manufacture of the capacitor pack 136. Other embodiments are contemplated in which the accumulated normalized running time 152 and accumulated calendar running time 154 are initialized to a value based on a combination of tolerance value and calendar age. Other embodiments are contemplated in which the accumulated normalized running time 152 and accumulated calendar running time 154 are initialized to a value based on a desired margin of error. Flow proceeds to block 904.

At block 904, the CPU 112 periodically samples the temperature and voltage of the capacitor pack 136 via the temperature sensors 142 and voltage sensors 144, respectively, of FIG. 1 over a larger time interval and averages the sampled temperature and voltage. In one embodiment, the sample period is 15 seconds and the averaging interval is one hour. Advantages of averaging the sampled values over a larger interval and writing the accumulated normalized running time 152 and accumulated calendar running time 154 to the non-volatile memory 108 once per the larger interval time, rather than each time the values are sampled, are that it reduces the amount of CPU 112 bandwidth consumed and potentially avoids exceeding the maximum number of write cycles to the non-volatile memory 108. Flow proceeds to block 906.

At block 906, the CPU 112 looks up the lifetime at the averaged temperature and voltage of block 904 by indexing the table 800 of FIG. 8 to obtain the lifetime for the averaged temperature and voltage. In one embodiment, the averaged temperature and voltage values are rounded up to the next highest value if necessary. For example, if the average temperature is 30.8 degrees, then the value is rounded up to 31 degrees for use as an index into the table 800 of FIG. 8. Similarly, if the average sampled voltage is 7.8V, then the value is rounded up to 8.2V and the voltage index into the table 800 is 0. It is noted that in an alternate embodiment, if the lifetime values are susceptible to being expressed by a function of temperature and voltage, the lifetime values may be calculated from the function rather than looked up in the table 800. A potential disadvantage of this embodiment is that it may require of the CPU 112 more computation bandwidth, in particular to perform floating point computations, than the table lookup method. However, a potential advantage of this embodiment is that it may enable a finer granularity of temperature and voltage values than the lookup table method. Flow proceeds to block 908.

At block 908, the CPU 112 normalizes the interval by multiplying the interval by the ratio of the warranted lifetime to the lifetime value obtained at block 906. For example, assume the interval is one hour, the warranted lifetime is 1000 hours, and the lifetime obtained at block 906 is 2000 hours (because the measured temperature and/or voltage are below the normal temperature and voltage), then the normalized interval would be 1 hour*(1000/2000)=0.5 hours; thus, the normalized interval is less than the calendar time of the interval, thereby indicating that effectively less than one hour of the capacitor pack 136 lifetime was reduced during the one hour calendar operating interval. In contrast, assume the lifetime obtained at block 906 is only 500 hours (because the measured temperature and/or voltage are above the normal temperature and voltage), then the normalized interval would be 1 hour*(1000/500)=2 hours; thus, the normalized interval is more than the calendar time of the interval, thereby indicating that effectively more than one hour of the capacitor pack 136 lifetime was reduced during the one hour calendar operating interval. Flow proceeds to block 912.

At block 912, the CPU 112 adds the normalized interval calculated at block 908 to the accumulated normalized running time 152 to produce an updated accumulated normalized running time 152 value reflecting the effect of operating the capacitor pack 136 at the average temperature and voltage obtained at block 904 over the interval of block 904. Additionally, the CPU 112 adds the averaging interval (i.e., the non-normalized interval, e.g., one hour) to the accumulated calendar running time 154 to produce an updated accumulated calendar running time 154 value. Flow proceeds to block 914.

At block 914, the CPU 112 writes the updated accumulated normalized running time 152 and accumulated calendar running time 154 calculated at block 912 to the non-volatile memory 108 so that their values may be maintained through a loss of main power and subsequently used again after the RAID controller 100 is rebooted. Flow proceeds to block 916.

At block 916, the CPU 112 calculates the percent of normalized warranted lifetime used as the ratio of the accumulated normalized running time 152 to the warranted lifetime. For example, if the accumulated normalized running time 152 is 200 hours and the warranted lifetime is 1000 hours, then the percent of normalized warranted lifetime used of the capacitor pack 136 is 20%, i.e., effectively 20% of the warranted lifetime has been used up, and effectively 800 hours of lifetime remain. Flow proceeds to block 918.

At block 918, the CPU 112 calculates the percentage capacitance drop of the capacitor pack 136 as the product of the percent of normalized warranted lifetime used calculated at block 916 and the end of life capacitance drop percentage. For example, if the end of life capacitance drop percentage is 30%, and the percent of normalized warranted lifetime used calculated at block 916 is 20%, then the percentage capacitance drop of the capacitor pack 136 is 6%. Flow proceeds to block 922.

At block 922, the CPU 112 reports the percentage capacitance drop of the capacitor pack 136 calculated at block 918 to the user. Furthermore, the user is informed whether the percentage capacitance drop is in a good, warning, or failed range. In one embodiment, once the percentage capacitance drop is within 1% of the end of life percentage capacitance drop, the user is warned that the end of life is approaching. In one embodiment, the user may input the range in which to be notified that the end of life is approaching. In one embodiment, the user is also informed of the end of life capacitance drop percentage for comparing against the percentage capacitance drop. In one embodiment, the CPU 108 also reports to the user the remaining number of normalized lifetime hours calculated as the warranted lifetime minus the accumulated normalized running time 152. In one embodiment, the temperature and voltage of the capacitor pack 136 as well as the voltage of each capacitor in the capacitor pack 136 is reported to the user. In one embodiment, the information is provided to the user via a serial interface. In one embodiment, the information is provided to the user via a web browser interface, such as via a TCP/IP connection over an Ethernet interface. Flow returns to block 904 to monitor the capacitor pack 136 lifetime for another interval.

As may be observed from FIG. 9, the RAID controller 100 advantageously calculates the accumulated normalized running time 152, which is effectively a measure of the age, or life, of the capacitor pack 136 relative to its warranted lifetime. In contrast to the accumulated calendar running time 154 which is a sum of the calendar time intervals over which the capacitor pack 136 is operated, the accumulated normalized running time 152 is a sum of normalized running times corresponding to the calendar time intervals that constitute the accumulated calendar running time 154. The normalized running times are calculated by normalizing the lifetime reading of table 800 for the average sampled temperature during the interval relative to the normal temperature at the average sampled operating voltage during the interval. Thus, the accumulated normalized running time 152 provides a more meaningful and accurate measure of the effective age of the capacitor pack 136 than the calendar age of the capacitor pack 136, and does so without suffering the detrimental performance impact associated with the discharging/recharging method of measuring the capacitance of the capacitor pack 136.

It is noted that in the embodiment described in FIG. 9, the accumulated normalized running time 152 and accumulated calendar running time 154 are only updated during operation of the RAID controller 100, and in particular, during operation of the CPU 112. In particular, these values are not updated when the entire RAID controller 100 is powered off and when the CPU 112 is powered off during a write cache 156 backup to non-volatile memory 108, which would be true in the embodiment of FIG. 1 (although not in the embodiment of FIG. 5). However, it is noted that when the RAID controller 100 is powered off, the charge on the capacitor pack 136 will typically drain relatively quickly, thereby reducing the voltage; and, at lower voltages the capacitor pack 136 ages very slowly. Thus, the powered-off time is likely not significant relative to embodiments with a warranted lifetime on the order of 5 years; however, in an embodiment in which the warranted lifetime is significantly less, the powered-off time may be taken into account. This is in contrast to batteries, whose ability to store energy degrades significantly during non-use. Furthermore, the amount of time required to perform the backup is on the order of minutes. Thus, the backup time, even if normalized at a higher temperature, is likely not significant relative to embodiments with a warranted lifetime on the order of 5 years; however, in an embodiment in which the warranted lifetime is significantly less, the backup time may be taken into account.

Figure 10:
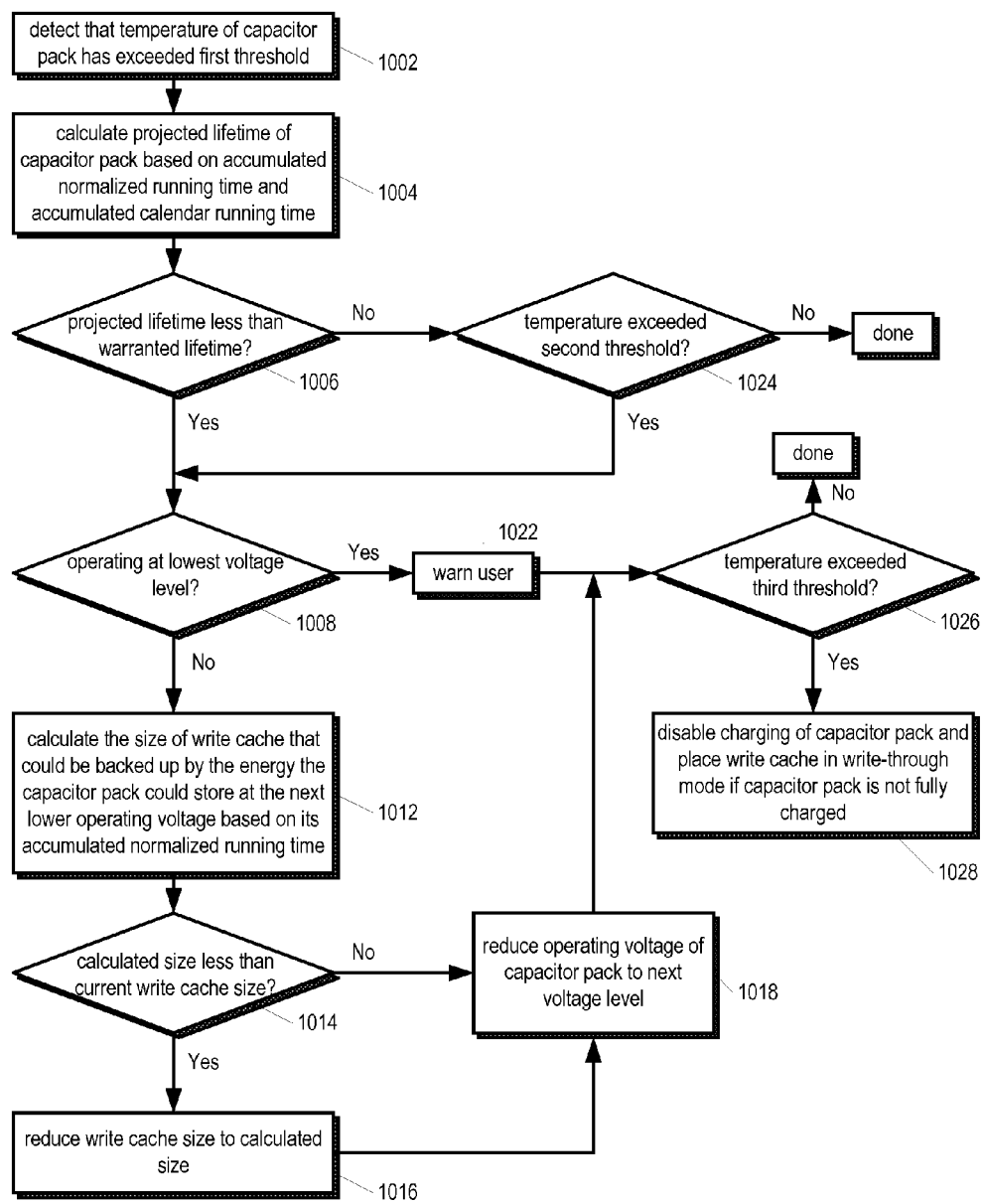
FIG. 10 is a flowchart illustrating operation of the RAID controller of FIG. 1 according to the present invention.

Referring now to FIG. 10, a flowchart illustrating operation of the RAID controller 100 of FIG. 1 according to the present invention is shown. In particular, FIG. 10 illustrates how the RAID controller 100 throttles the operating voltage of the capacitor pack 136 to extend the accumulated normalized running time 152 of the capacitor pack 136 when necessary. FIG. 10 also illustrates how the RAID controller 100 dynamically reduces the write cache 156 size when necessary. Flow begins at block 1002.

At block 1002, the CPU 112 detects that the temperature of the capacitor pack 136 has exceeded a first predetermined threshold. In one embodiment, the first predetermined threshold is 51 degrees Celsius. Although FIG. 10 discloses an embodiment in which the operating voltage of the capacitor pack 136 is throttled and the write cache 156 size is adjusted in response to detecting that the capacitor pack 136 temperature has exceeded a threshold, the voltage throttling and write cache 156 size adjustment methods described herein are not limited to this embodiment; rather, other embodiments are contemplated in which the RAID controller 100 throttles the operating voltage and adjusts the write cache 156 size for other reasons. For example, in one embodiment, at the end of each interval of FIG. 9, when the CPU 112 calculates the accumulated normalized running time 152 and accumulated calendar running time 154, the CPU 112 proceeds to block 1004 to determine whether voltage throttling and/or write cache 156 size adjustment is necessary. For another example, although the temperature of the capacitor pack 136 may not have risen above the first threshold, the RAID controller 100 may determine that the capacitor pack 136 is reaching the end of its life and give the user the option of continuing to operate instead replacing the RAID controller 100, albeit at a smaller write cache 156 size. Flow proceeds to block 1004.

At block 1004, the CPU 112 calculates the projected lifetime of the capacitor pack 136 based on the accumulated normalized running time 152 and the accumulated calendar running time 154. In particular, the projected lifetime is calculated as the product of the warranted lifetime and the ratio of the accumulated calendar running time 154 to the accumulated normalized running time 152. For example, if the warranted lifetime is 1000 hours, the accumulated calendar running time 154 is 300 hours, and the accumulated normalized running time 152 is 200 hours, then the projected lifetime is 1000 hours*(300/200)=1500 hours. Flow proceeds to decision block 1006.

At decision block 1006, the CPU 112 compares the projected lifetime of the capacitor pack 136 calculated at block 1004 with the warranted lifetime to determine whether the projected lifetime is less than the warranted lifetime. If so, flow proceeds to decision block 1008; otherwise, flow proceeds to decision block 1024.

At decision block 1008, the CPU 112 determines whether the capacitor pack 136 is already currently operating at the lowest voltage level. In the example in which only two voltage levels are provided (e.g., 8.2V and 7.2V), then the lowest voltage level is 7.2V. However, other embodiments are contemplated in which more than two voltage levels are provided. An advantage of providing more voltage levels is that the finer granularity may enable finer granularity adjustments of the write cache 156; however, a disadvantage is that it potentially requires more complex voltage adjustment circuitry and software for making the voltage adjustments and write cache 156 size adjustments. If the capacitor pack 136 is already currently operating at the lowest voltage level, then flow proceeds to block 1022; otherwise, flow proceeds to block 1012.

At block 1012, the CPU 112 has determined that the capacitor pack 136 operating voltage must be reduced, so the CPU 112 calculates the size of the write cache 156 that could be backed up by the amount of energy the capacitor pack 136 could store at the next lower operating voltage based on its accumulated normalized running time 152. For example, assume a write cache 156 whose full size is 512 MB, and two voltage levels of 8.2V (2.05V per capacitor) and 7.2V (or 1.8V per capacitor). Although the number of individual capacitors in the capacitor pack 136 may vary, the percentage capacitance drop calculation for a single capacitor is equivalent to the percentage capacitance drop of the entire capacitor pack 136. If $C_o$ is the original capacitance of a capacitor, the energy stored in the capacitor at the normal 2.05V operating voltage after the 30% end of life percentage capacitance drop is: $E_{2.05,\ 30\%\ capacitance\ drop} = \frac{1}{2}*0.7C_o*(2.05^2-0.8^2) = \frac{1}{2}*C_o*2.494$. The energy stored in a capacitor at the lower 1.8V operating voltage with zero percentage capacitance drop is: $E_{1.8,\ no\ capacitance\ drop} = \frac{1}{2}*C_o*(1.8^2-0.8^2) = \frac{1}{2}*C_o*2.6$. Since 2.6 is larger than 2.494, the capacitor pack 136 is capable of storing enough energy to back up the full size 512 MB write cache 156; therefore, no write cache 156 size adjustment is needed, as would be determined at block 1014 below. However, if there is already a 10% capacitance drop, the energy stored is: $E_{1.8,\ 10\%\ capacitance\ drop} = \frac{1}{2}*C*2.34$. Since 2.34 is less than 2.494, the capacitor pack 136 is storing enough energy to backup only a (2.34/2.494)*512 MB=480 MB write cache 156. Similarly, if there is already a 20% capacitance drop, the energy stored is: $E_{1.8,\ 20\%\ capacitance\ drop} = \frac{1}{2}*C*2.08$. Thus, the capacitor pack 136 is storing enough energy to backup only a (2.08/2.494)*512 MB=427 MB write cache 156. In one embodiment, the software executing on the CPU 112 maintains a table of write cache 156 size values for each percentage capacitance drop between zero and the end of life percentage capacitance drop, for each possible operating voltage level. The table is indexed by the percentage capacitance drop, such as is calculated at block 918 of FIG. 9. In one embodiment, the percentage capacitance drop is also written to non-volatile memory 108 after being calculated at block 918. Flow proceeds to decision block 1014.

At decision block 1014, the CPU 112 determines whether the write cache 156 size calculated at block 1012 is less than the current write cache 156 size. If so, flow proceeds to block 1016; otherwise, flow proceeds to block 1018.

At block 1016, the CPU 112 reduces the write cache 156 size to the size calculated at block 1012. In one embodiment, the CPU 112 reduces the write cache 156 size by pausing processing of host I/O requests, flushing the write cache 156, reducing the write cache to the desired size (and optionally increasing the read cache size accordingly), and resuming host I/O processing. In one embodiment, in order to reduce the amount of time that the host I/O request processing is paused, the CPU 112 flushes only the section of the write cache 156 that is to be removed from the write cache 156 (and optionally added to the read cache), which will typically be the section adjacent to the read cache. In one embodiment, the CPU 112 also writes the new write cache 156 and read cache 158 sizes to the non-volatile memory 108 so that after a reboot of the RAID controller 100 the CPU 112 can configure the write cache 156 and read cache 158 sizes to the new values. Flow proceeds to block 1018.

At block 1018, the CPU 112 reduces the operating voltage of the capacitor pack 136 to the next voltage level in order to increase the lifetime of the capacitor pack 136. In one embodiment, the RAID controller 100 also notifies the user that the operating voltage has been reduced. In one embodiment, the CPU 112 also writes the new operating voltage to the non-volatile memory 108 so that after a reboot of the RAID controller 100 the CPU 112 can set the operating voltage to the new value. In one embodiment, the power manager 132 includes a control register that the CPU 112 writes to adjust the operating voltage of the capacitor pack 136. Flow proceeds to decision block 1026.

At block 1022, the CPU 112 has determined that although the capacitor pack 136 voltage needs to be reduced in order to increase the lifetime of the capacitor pack 136, the capacitor pack 136 is already operating at the lowest voltage level, and therefore cannot be reduced. Consequently, the CPU 112 issues to the user a warning message of this condition. Flow proceeds to decision block 1026.

At decision block 1024, the CPU 112 determines whether the capacitor pack 136 temperature has exceeded a second predetermined threshold. In one embodiment, the second predetermined threshold is 55 degrees Celsius. If the temperature has exceeded the second predetermined threshold, then flow proceeds to decision block 1008 in order to reduce the operating voltage of the capacitor pack 136—and reduce the write cache 156 size, if necessary—regardless of the fact that the projected lifetime of the capacitor pack 136 calculated at block 1004 is at least as great as the warranted lifetime. If the temperature has not exceeded the second predetermined threshold, then flow ends.

At decision block 1026, the CPU 112 determines whether the capacitor pack 136 temperature has exceeded a third predetermined threshold. In one embodiment, the third predetermined threshold is 59 degrees Celsius. If the temperature has exceeded the third predetermined threshold, then flow proceeds to block 1028; otherwise, flow ends.

At block 1028, the CPU 112 disables charging of the capacitor pack 136 to avoid prematurely reducing the lifetime of the capacitor pack 136 beyond its warranted lifetime. The most likely causes of the acute temperature rise are the capacitor pack 136 charging excessively and a cooling fan failure in the system. Additionally, the CPU 112 places the write cache 156 in write-through mode if the capacitor pack 136 is not fully charged and will therefore likely not be storing sufficient energy to power the backup of the write cache 156 to the non-volatile memory 108. Flow ends at block 1028. In one embodiment, the CPU 112 delays a predetermined amount of time and then attempts to resume charging the capacitor pack 136.

As may be observed from FIG. 10, the RAID controller 100 advantageously reduces the operating voltage of the capacitor pack 136 to increase its lifetime if, based on the accumulated normalized running time 152, the warranted lifetime of the capacitor pack 136 will not be met. Furthermore, if the RAID controller 100 determines that the capacitance of the capacitor pack 136 has dropped an amount that prevents the capacitor pack 136 from being capable of storing enough energy at the new operating voltage to support the write cache 156 backup, then the RAID controller 100 advantageously reduces the write cache 156 size to an amount for which the capacitor pack 136 can support the backup.

Figure 11:
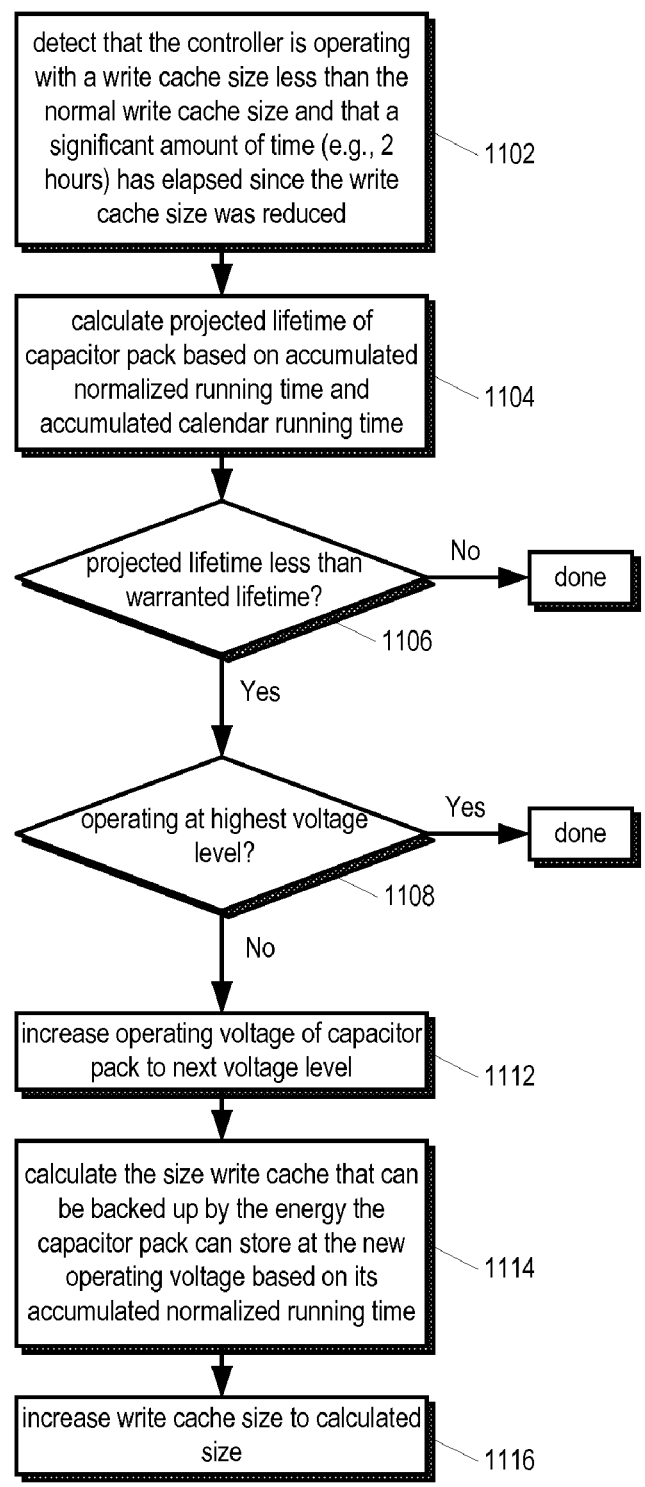
FIG. 11 is a flowchart illustrating operation of the RAID controller of FIG. 1 according to the present invention.

Referring now to FIG. 11, a flowchart illustrating operation of the RAID controller 100 of FIG. 1 according to the present invention is shown. In particular, the flowchart illustrates the RAID controller 100 increasing the operating voltage and write cache 156 size when appropriate. Flow begins at block 1102.

At block 1102, the CPU 112 detects that the RAID controller 100 is currently operating with a write cache 156 size that is less than the normal, or full, write cache 156 size and that a significant amount of time has elapsed since the write cache 156 size was reduced. In one embodiment, the amount of time is approximately 2 hours to avoid frequently adjusting the write cache 156 size, which may lead to inefficiency. Flow proceeds to block 1104.

At block 1104, the CPU 112 calculates the projected lifetime of the capacitor pack 136 based on the accumulated normalized running time 152 and the accumulated calendar running time 154, similarly to the step performed at block 1004 of FIG. 10. Flow proceeds to decision block 1106.

At decision block 1106, the CPU 112 compares the projected lifetime of the capacitor pack 136 calculated at block 1104 with the warranted lifetime to determine whether the projected lifetime is less than the warranted lifetime. If not, flow ends; otherwise, flow proceeds to decision block 1108. In one embodiment, the CPU 112 determines whether the projected lifetime is less than the warranted lifetime by a predetermined percentage, rather than strictly less than the warranted lifetime, in order to avoid causing thrashing with respect to the adjusting of the write cache 156 size.

At decision block 1108, the CPU 112 determines whether the capacitor pack 136 is already currently operating at the highest voltage level. If so, flow ends; otherwise, flow proceeds to block 1112.

At block 1112, the CPU 112 increases the operating voltage of the capacitor pack 136 to the next voltage level. Flow proceeds to block 1114.

At block 1114, the CPU 112 calculates the size of the write cache 156 that can be backed up by the energy the capacitor pack 136 can store at the new operating voltage set at block 1112 based on the accumulated normalized running time 152 of the capacitor pack 136. Flow proceeds to block 1116.

At block 1116, the CPU 112 increases the write cache 156 size to the value calculated at block 1114. In one embodiment, the CPU 112 increases the write cache 156 size by pausing processing of host I/O requests, increasing the write cache 156 to the desired size, and resuming host I/O processing. In conjunction with the embodiment described with respect to block 1016 of FIG. 10 in which the read cache 158 size is increased coordinately with a write cache 156 size decrease, at block 1116 the CPU 112 also completes all currently outstanding read requests after pausing host I/O request processing and then decreases the read cache size accordingly before increasing the write cache size. Flow ends at block 1116.

As may be observed from FIG. 11, the RAID controller 100 advantageously increases the operating voltage and write cache 156 size after it determines, based on the accumulated normalized running time 152, that it is safe to do so.

Figure 12:
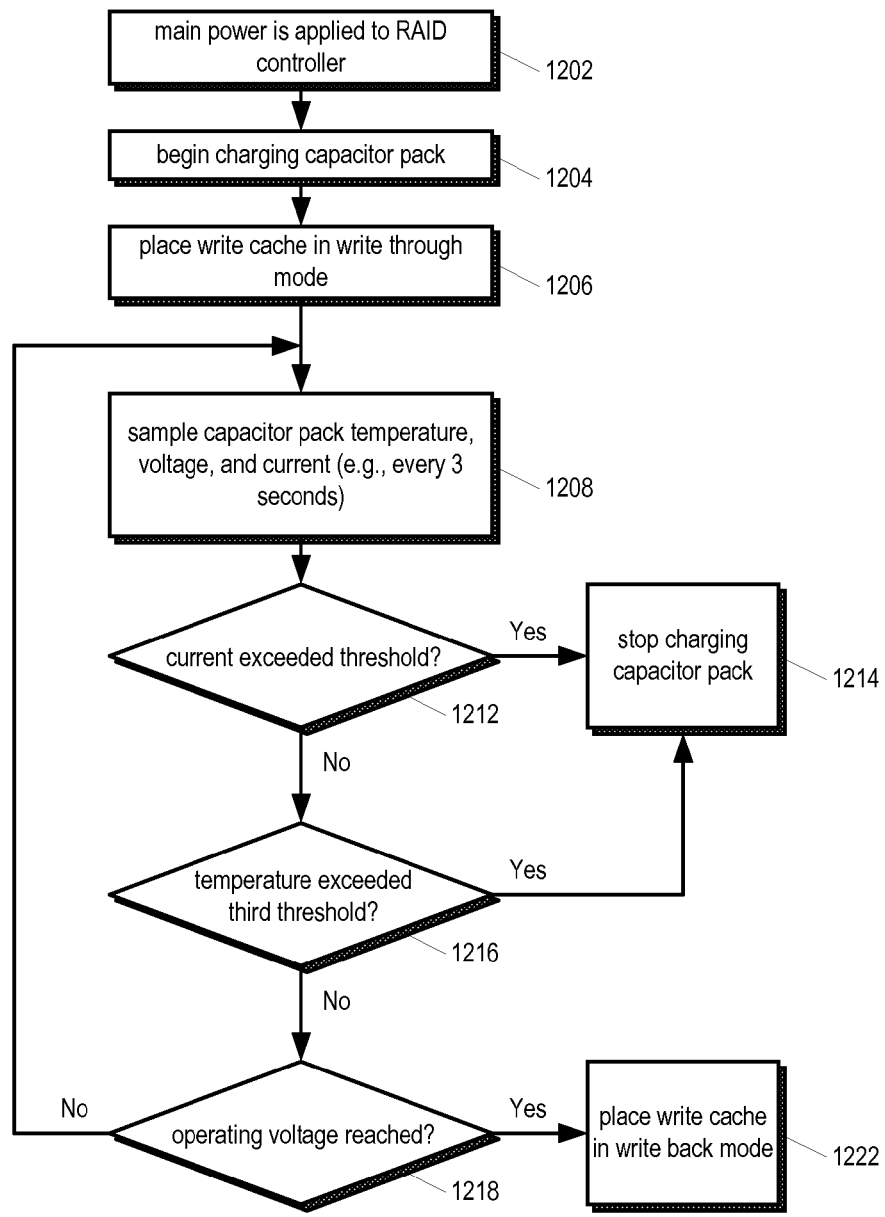
FIG. 12 is a flowchart illustrating operation of the RAID controller of FIG. 1 according to the present invention.

Referring now to FIG. 12, a flowchart illustrating operation of the RAID controller 100 of FIG. 1 according to the present invention is shown. In particular, the flowchart of FIG. 12 illustrates operation of the RAID controller 100 to avoid prematurely aging the capacitor pack 136 during booting of the RAID controller 100. Flow begins at block 1202.

At block 1202, main power is applied to the RAID controller 100. This implies that the capacitor pack 136 has at least partially, if not fully, discharged. Flow proceeds to block 1204.

At block 1204, the power manager 132 begins charging the capacitor pack 136. Flow proceeds to block 1206.

At block 1206, the CPU 112 places the write cache 156 into write-through mode, since the capacitor pack 136 is not fully charged and therefore may not be capable of supplying sufficient energy to perform the write cache 156 to non-volatile memory 108 backup operation. Flow proceeds to block 1208.

At block 1208, the CPU 112 periodically samples the temperature, voltage, and current draw of the capacitor pack 136 via the temperature sensors 142, voltage sensors 144, and current sensors 146, respectively, of FIG. 1. In one embodiment, the sample period is 3 seconds during all times while the capacitor pack 136 is being charged, which is shorter than the non-charging sample period, in order to more quickly detect temperature or current increases that might otherwise prematurely age the capacitor pack 136 beyond its warranted lifetime. Flow proceeds to decision block 1212.

At decision block 1212, the CPU 112 determines whether the current draw of the capacitor pack 136 has exceeded a predetermined threshold. In one embodiment, the predetermined threshold is 2 Amps. If so, flow proceeds to block 1214; otherwise, flow proceeds to decision block 1216.

At block 1214, the CPU 112 causes the capacitor pack 136 to stop charging, in order to avoid prematurely aging the capacitor pack 136 beyond its warranted lifetime. Flow ends at block 1214. In one embodiment, the CPU 112 delays a predetermined amount of time and then attempts to resume charging the capacitor pack 136 and returns to block 1208.

At decision block 1216, the CPU 112 determines whether the temperature has exceed the third predetermined threshold, similarly to the step performed at decision block 1026 of FIG. 10. If the temperature has exceeded the third predetermined threshold, flow proceeds to block 1214; otherwise, flow proceeds to decision block 1218.

At decision block 1218, the CPU 112 determines whether the voltage of the capacitor pack 136 has reached its designated operating voltage level. In one embodiment, the current operating voltage level is stored in non-volatile memory 108 so that in the event of a loss of main power and subsequent reboot, the CPU 112 may determine the operating voltage prior to the loss of main power and restore it thereto. If the voltage of the capacitor pack 136 has reached its designated operating voltage level, flow proceeds to block 1222; otherwise, flow returns to block 1208.

At block 1222, the CPU 112 places the write cache 156 in write-back mode since the capacitor pack 136 is fully charged. Flow ends at block 1222.

Figure 13:
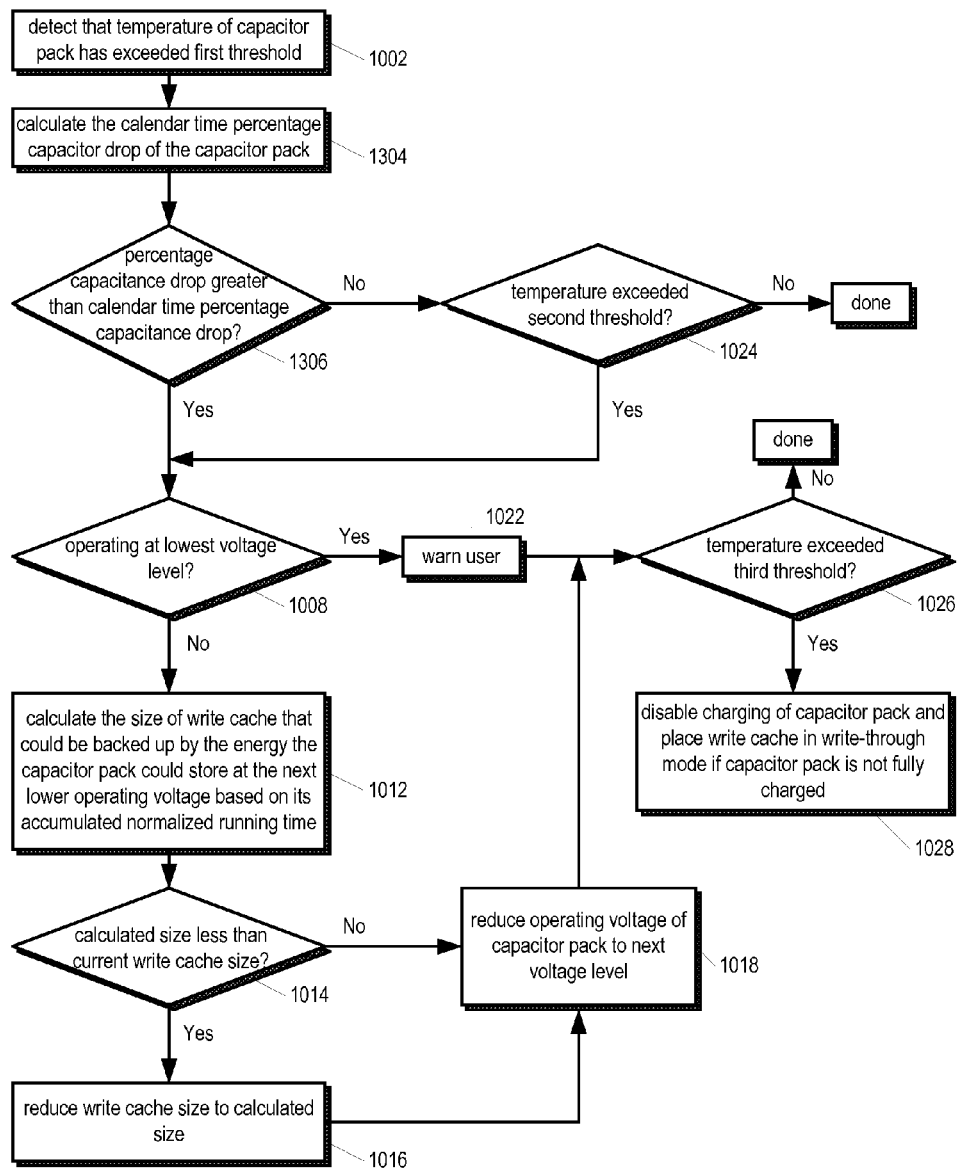
FIG. 13 is a flowchart illustrating operation of the RAID controller according to an alternate embodiment of the present invention.

Referring now to FIG. 13, a flowchart illustrating operation of the RAID controller 100 according to an alternate embodiment of the present invention is shown. The flowchart of FIG. 13 illustrates how the RAID controller 100 throttles the operating voltage of the capacitor pack 136 to extend the accumulated normalized running time 152 of the capacitor pack 136 when necessary, and how the RAID controller 100 dynamically reduces the write cache 156 size when necessary, similarly to FIG. 10; however, the embodiment of FIG. 13 employs a different comparison for determining whether the operating voltage needs throttling. Consequently, the flowchart of FIG. 13 is similar to the flowchart of FIG. 10; however, flow proceeds from block 1002 to block 1304 rather than to block 1004.

At block 1304, the CPU 112 calculates the calendar time percentage capacitance drop of the capacitor pack 136 as the product of the end of life percentage capacitance drop and the ratio of the accumulated calendar running time 154 to the warranted lifetime. Thus, for example, if the end of life percentage capacitance drop is 30%, the accumulated calendar running time 154 is 400 hours, and the warranted lifetime is 1000 hours, then the calendar time percentage capacitance drop is 12%. Flow proceeds to decision block 1306.

At decision block 1306, the CPU 112 compares the percentage capacitance drop calculated at block 918 of FIG. 9 with the calendar time percentage capacitance drop calculated at block 1304 to determine whether the percentage capacitance drop is greater than the calendar time percentage capacitance drop. If so, flow proceeds to decision block 1008; otherwise, flow proceeds to decision block 1024, as in FIG. 10.

Figure 14:
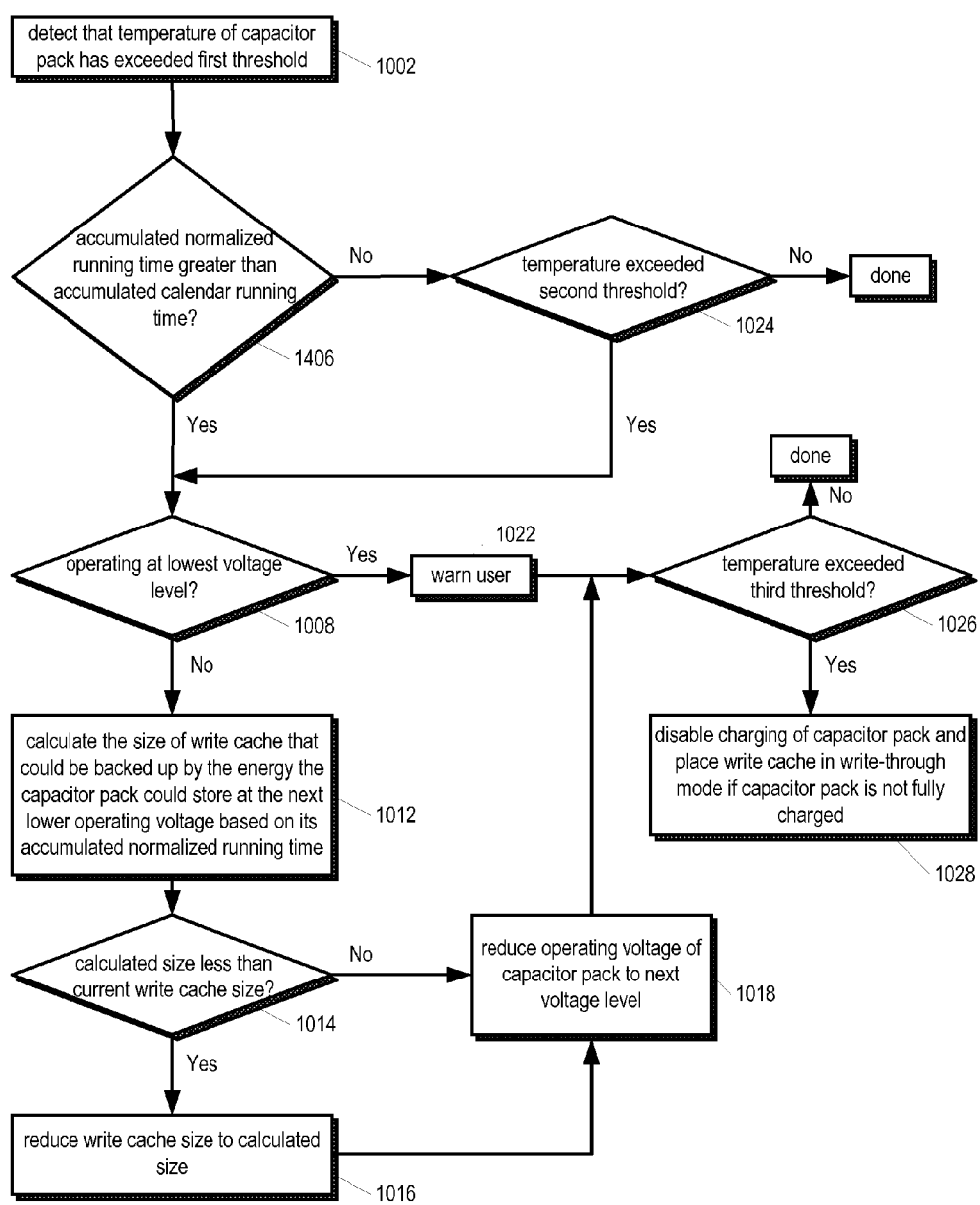
FIG. 14 is a flowchart illustrating operation of the RAID controller according to an alternate embodiment of the present invention.

Referring now to FIG. 14, a flowchart illustrating operation of the RAID controller 100 according to an alternate embodiment of the present invention is shown. The flowchart of FIG. 14 illustrates how the RAID controller 100 throttles the operating voltage of the capacitor pack 136 to extend the accumulated normalized running time 152 of the capacitor pack 136 when necessary, and how the RAID controller 100 dynamically reduces the write cache 156 size when necessary, similarly to FIG. 10; however, the embodiment of FIG. 14 employs a different comparison for determining whether the operating voltage needs throttling. Consequently, the flowchart of FIG. 14 is similar to the flowchart of FIG. 10; however, flow proceeds from block 1002 to decision block 1406 rather than to block 1004.

At decision block 1406, the CPU 112 compares the accumulated normalized running time 152 calculated at block 912 of FIG. 9 with the accumulated calendar running time 154 calculated at block 914 of FIG. 9 to determine whether the accumulated normalized running time 152 is greater than the accumulated calendar running time 154. If so, flow proceeds to decision block 1008; otherwise, flow proceeds to decision block 1024, as in FIG. 10.

Figure 15:
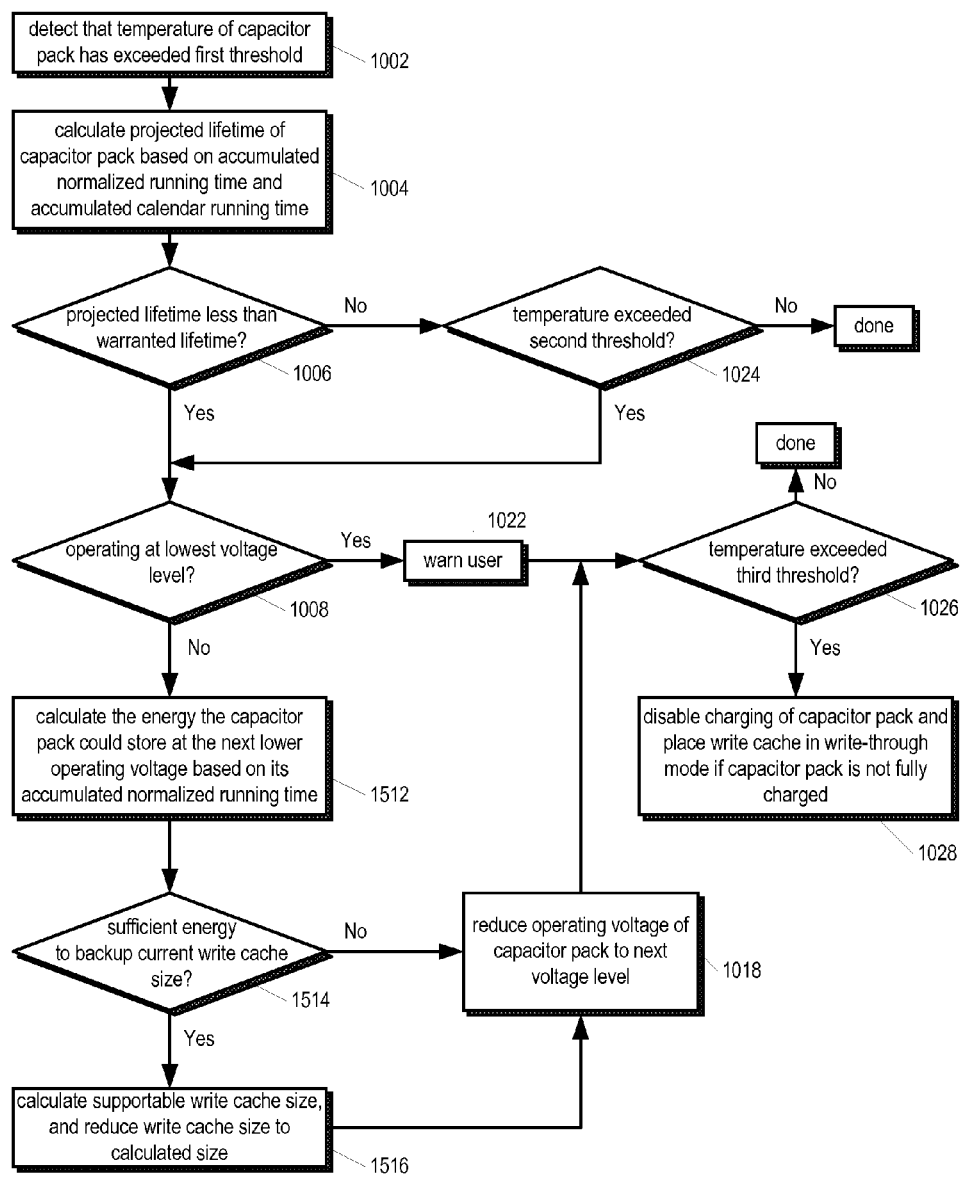
FIG. 15 is a flowchart illustrating operation of the RAID controller according to an alternate embodiment of the present invention.

Referring now to FIG. 15, a flowchart illustrating operation of the RAID controller 100 according to an alternate embodiment of the present invention is shown. The flowchart of FIG. 15 illustrates how the RAID controller 100 throttles the operating voltage of the capacitor pack 136 to extend the accumulated normalized running time 152 of the capacitor pack 136 when necessary, and how the RAID controller 100 dynamically reduces the write cache 156 size when necessary, similarly to FIG. 10; however, the embodiment of FIG. 15 employs a different comparison for determining whether the write cache 156 size needs reducing. Consequently, the flowchart of FIG. 15 is similar to the flowchart of FIG. 10; however, if the capacitor pack 136 is not currently operating at the lowest voltage level, flow proceeds from decision block 1008 to block 1512 rather than to block 1012.

At block 1512, the CPU 112 calculates the energy the capacitor pack 136 could store at the next lower operating voltage based on its accumulated normalized running time 152. In particular, the CPU 112 calculates the energy according to equation (1) above. The capacitance value used for each capacitor in the capacitor pack 136 is the product of the original capacitance of capacitor and the quantity one minus the percentage capacitance drop calculated at block 918 of FIG. 9. Flow proceeds to decision block 1514.

At decision block 1514, the CPU 112 determines whether the energy calculated at block 1512 is sufficient to power backing up the write cache 156 to the non-volatile memory 108. If so, flow proceeds to block 1516; otherwise, flow proceeds to block 1018.

At block 1516, the CPU 112 calculates the write cache 156 size supportable at the next lower operating voltage, similarly to the step performed at block 1012 of FIG. 10. The CPU 112 then reduces the write cache 156 size to the calculated size. Flow proceeds to block 1018.

Although the present invention and its objects, features, and advantages have been described in detail, other embodiments are encompassed by the invention. For example, although embodiments have been described with respect to a RAID controller, the methods of monitoring the capacitor pack lifetime, dynamically adjusting the capacitor pack operating voltage to provide a warranted lifetime, and dynamically adjusting the write cache size may be beneficially employed in any type of storage controller. Additionally, although embodiments have been described in which the capacitor pack is primarily used to supply power while the storage controller backs up a volatile write cache to a non-volatile memory, the methods described herein may be beneficially employed for any use in which a capacitor pack is used as a rechargeable energy source. An example of another use for the capacitor pack includes keeping the volatile write cache powered until main power is restored, such as in a storage controller that does not include a non-volatile memory to which the volatile write cache may be backed up.

Although embodiments have been described in which the capacitance of the capacitor pack is monitored as a whole, embodiments are contemplated in which the lifetime of each individual capacitor in the pack is monitored based on the individual operating voltage and temperature of each individual capacitor, and the lifetime of the capacitor pack as a whole is determined as the smallest lifetime of the individual capacitors.

Although the physical laws governing the invention are discussed, such as the various energy and capacitance calculations, it should be understood that these values need not necessarily be directly or fully calculated in order to practice the invention. In other words, various embodiments employing the governing physical laws are contemplated. For example, embodiments are contemplated in which the energy, capacitance, capacitance drop, percentage capacitance drop, write cache size, and so forth values are pre-calculated for common voltage and temperature values and stored in a table which is accessed based on the measured voltage and temperature readings. Other embodiments are contemplated in which the values are fully calculated according to the equations, rather than looked up in a table. Other embodiments are contemplated in which directly calculated and pre-calculated values are used in combination.

Although embodiments have been described in which the CPU 112 performs the various calculations described such as the calculation of the accumulated normalized running time 152, other embodiments are contemplated in which dedicated circuitry performs the calculations, such as circuitry within the power manager 132. Finally, although embodiments have been described in which various threshold values are specified, it should be understood that the present invention may be employed with other threshold values.

Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A method for improving the data availability of a write-caching storage controller having a capacitor pack used to supply power for backing up a volatile write cache to a non-volatile memory in response to a loss of main power, the method comprising:
   determining whether reducing an operating voltage of the capacitor pack to a new value would cause the capacitor pack to be storing less energy than required for backing up the volatile write cache to the non-volatile memory; and
   reducing a size of the volatile write cache, prior to said reducing said operating voltage, if said reducing said operating voltage to said new value would cause the capacitor pack to be storing less energy than required for backing up the volatile write cache to the non-volatile memory.

2. The method as recited in claim 1, further comprising:
   estimating a capacity of the capacitor pack to store said energy required for backing up the volatile write cache to said non-volatile memory based on a history of temperature and said operating voltage readings of the capacitor pack during operation of the storage controller;
   wherein said determining is based on said estimating said capacitance.

3. The method as recited in claim 2, further comprising:
   displaying to a user an indication of said capacity.

4. The method as recited in claim 3, wherein said displaying to a user an indication of said capacity comprises displaying said capacity as a percentage of an original capacity of the capacitor pack.

5. The method as recited in claim 1, further comprising:
   detecting a need to reduce said operating voltage of the capacitor pack to said new value;
   wherein said determining is performed in response to said detecting said need.

6. The method as recited in claim 5, further comprising:
   calculating an accumulated normalized running time of the capacitor pack;
   wherein said detecting said need to reduce said operating voltage of the capacitor pack to said new value comprises determining that said accumulated normalized running time is greater than an accumulated calendar running time of the capacitor pack.

7. The method as recited in claim 6, wherein said calculating said accumulated normalized running time comprises:
   (1) initializing said accumulated normalized running time;
   (2) sensing said temperature and said operating voltage of the capacitor pack during an interval of time over which the capacitor pack is operated, after said initializing;
   (3) determining a lifetime over which the capacitor pack would have a capacity to store at least a predetermined amount of energy if operated at said temperature and said operating voltage during said lifetime;
   (4) normalizing said interval of time by a ratio of said warranted lifetime relative to said lifetime;
   (5) adding said normalized interval of time to said accumulated normalized running time; and
   (6) repeating steps (2) through (5) during operation of the storage controller.

8. The method as recited in claim 7, further comprising:
   (7) initializing said accumulated calendar running time of the capacitor pack, prior to said step (2); and (8) adding said interval of time to said accumulated calendar running time;

wherein said step (6) comprises repeating said steps (2) through (5) and (8) during operation of the storage controller.

9. The method as recited in claim 6, further comprising:

determining that said accumulated normalized running time of the capacitor pack is greater than said accumulated calendar running time, after said reducing said operating voltage of the capacitor pack to said new value; and increasing said operating voltage of the capacitor pack, in order to increase an amount of energy stored in the capacitor pack.

10. The method as recited in claim 1, further comprising:

calculating said reduced size, prior to said reducing, based on a capacity of the capacitor pack to store energy based on a history of temperature and said operating voltage readings of the capacitor pack during operation of the storage controller.

11. A high data availability write-caching storage controller, comprising:

a volatile memory, comprising a write cache for caching write cache data;

a non-volatile memory, coupled to said volatile memory;

a capacitor pack, coupled to said volatile and non-volatile memory, for supplying power for backing up said write cache to said non-volatile memory in response to a loss of main power; and a CPU, coupled to said volatile and non-volatile memory, for dynamically determining a size of said write cache, configured to:

determine whether reducing an operating voltage of the capacitor pack to a new value would cause the capacitor pack to be storing less energy than required for backing up said write cache having a current said size to said non-volatile memory; and reduce said size of the volatile write cache, prior to reducing said operating voltage, if reducing said operating voltage to said new value would cause the capacitor pack to be storing less energy than required for backing up the write cache having said current said size to the non-volatile memory.

12. The controller as recited in claim 11, said CPU is further configured to:

estimate a capacity of the capacitor pack to store said energy required for backing up the volatile write cache to said non-volatile memory based on a history of temperature and said operating voltage readings of the capacitor pack during operation of the storage controller;

wherein said CPU determines whether to reduce said size of said write cache based on said estimated capacity.

13. The controller as recited in claim 12, said CPU is further configured to:

display to a user an indication of said capacity.

14. The controller as recited in claim 13, wherein said CPU displays to a user an indication of said capacity by displaying said capacity as a percentage of an original capacity of the capacitor pack.

15. The controller as recited in claim 11, said CPU is further configured to:

detect a need to reduce said operating voltage of the capacitor pack to said new value;

wherein said CPU determines whether to reduce said size of said write cache in response to said detecting said need.

16. The controller as recited in claim 15, further comprising:

calculating an accumulated normalized running time of the capacitor pack;

wherein said detecting said need to reduce said operating voltage of the capacitor pack to said new value comprises determining that said accumulated normalized running time is greater than an accumulated calendar running time of the capacitor pack.

17. The controller as recited in claim 16, wherein said CPU calculates said accumulated normalized running time by:

(1) initializing said accumulated normalized running time;

(2) sensing said temperature and said operating voltage of the capacitor pack during an interval of time over which the capacitor pack is operated, after said initializing;

(3) determining a lifetime over which the capacitor pack would have a capacity to store at least a predetermined amount of energy if operated at said temperature and said operating voltage during said lifetime;

(4) normalizing said interval of time by a ratio of said warranted lifetime relative to said lifetime;

(5) adding said normalized interval of time to said accumulated normalized running time; and (6) repeating steps (2) through (5) during operation of the storage controller.

18. The controller as recited in claim 17, wherein said CPU is further configured to:

(7) initialize said accumulated calendar running time of the capacitor pack, prior to said step (2); and (8) add said interval of time to said accumulated calendar running time;

wherein said step (6) comprises repeating said steps (2) through (5) and (8) during operation of the storage controller.

19. The controller as recited in claim 16, wherein said CPU is further configured to:

determine that said accumulated normalized running time of the capacitor pack is greater than said accumulated calendar running time, after reducing said operating voltage of the capacitor pack to said new value; and increase said operating voltage of the capacitor pack, in order to increase an amount of energy stored in the capacitor pack.

20. The controller as recited in claim 11, wherein said CPU is further configured to:

calculate said reduced size, prior to reducing said size of said write cache, based on a capacity of the capacitor pack to store energy based on a history of temperature and said operating voltage readings of the capacitor pack during operation of the storage controller.

21. A method for improving the data availability of a write-caching storage controller having a capacitor pack used to supply power for backing up a volatile write cache to a non-volatile memory in response to a loss of main power, the method comprising:

determining a size of the volatile write cache for which the capacitor pack would have a capacity to store enough energy to backup said size volatile write cache to the non-volatile memory if an operating voltage of the capacitor pack was reduced to a new value; and reducing the volatile write cache to said size, prior to reducing said operating voltage to said new value, if said size is less than a current size of the write cache.

22. The method as recited in claim 21, further comprising:
estimating said capacity of the capacitor pack based on a history of temperature and said operating voltage readings of the capacitor pack during operation of the storage controller;
wherein said determining said size of the write cache is based on said estimating said capacity.

23. The method as recited in claim 21, further comprising:
detecting a need to reduce said operating voltage of the capacitor pack to said new value;
wherein said determining said size of the write cache is performed in response to said detecting said need.

24. The method as recited in claim 23, further comprising:
calculating an accumulated normalized running time of the capacitor pack;
wherein said detecting said need to reduce said operating voltage of the capacitor pack to said new value comprises determining that said accumulated normalized running time is greater than an accumulated calendar running time of the capacitor pack.

25. The method as recited in claim 24, wherein said calculating said accumulated normalized running time comprises:
(1) initializing said accumulated normalized running time;
(2) sensing said temperature and said operating voltage of the capacitor pack during an interval of time over which the capacitor pack is operated, after said initializing;
(3) determining a lifetime over which the capacitor pack would have a capacity to store at least a predetermined amount of energy if operated at said temperature and said operating voltage during said lifetime;
(4) normalizing said interval of time by a ratio of said warranted lifetime relative to said lifetime;
(5) adding said normalized interval of time to said accumulated normalized running time; and
(6) repeating steps (2) through (5) during operation of the storage controller.

26. The method as recited in claim 25, further comprising:
(7) initializing said accumulated calendar running time of the capacitor pack, prior to said step (2); and
(8) adding said interval of time to said accumulated calendar running time;
wherein said step (6) comprises repeating said steps (2) through (5) and (8) during operation of the storage controller.

27. The method as recited in claim 24, further comprising:
determining that said accumulated normalized running time of the capacitor pack is greater than said accumulated calendar running time, after reducing said operating voltage of the capacitor pack to said new value; and
increasing said operating voltage of the capacitor pack, in order to increase an amount of energy stored in the capacitor pack.

28. A high data availability write-caching storage controller, comprising:
a volatile memory, comprising a write cache for caching write cache data;
a non-volatile memory, coupled to said volatile memory;
a capacitor pack, coupled to said volatile and non-volatile memory, for supplying power for backing up said write cache to said non-volatile memory in response to a loss of main power; and
a CPU, coupled to said volatile and non-volatile memory, configured to:
determine a size of said volatile write cache for which said capacitor pack would have a capacity to store enough energy to backup said size volatile write cache to said non-volatile memory if an operating voltage of said capacitor pack was reduced to a new value; and
reduce said volatile write cache to said size, prior to reducing said operating voltage to said new value, if said size is less than a current size of said write cache.

29. The controller as recited in claim 28, wherein said CPU is further configured to:
estimate said capacity of said capacitor pack based on a history of temperature and said operating voltage readings of said capacitor pack during operation of the storage controller;
wherein said CPU determines said size of said write cache based on said estimated capacity.

30. The controller as recited in claim 28, wherein said CPU is further configured to:
detect a need to reduce said operating voltage of said capacitor pack to said new value;
wherein said CPU determines said size of said write cache in response to detecting said need.

31. The controller as recited in claim 30, wherein said CPU is further configured to:
calculate an accumulated normalized running time of said capacitor pack;
wherein said CPU detects said need to reduce said operating voltage of said capacitor pack to said new value by determining that said accumulated normalized running time is greater than an accumulated calendar running time of said capacitor pack.

32. The controller as recited in claim 31, wherein said CPU calculates said accumulated normalized running time by:
(1) initializing said accumulated normalized running time;
(2) sensing said temperature and said operating voltage of said capacitor pack during an interval of time over which said capacitor pack is operated, after said initializing;
(3) determining a lifetime over which said capacitor pack would have a capacity to store at least a predetermined amount of energy if operated at said temperature and said operating voltage during said lifetime;
(4) normalizing said interval of time by a ratio of said warranted lifetime relative to said lifetime;
(5) adding said normalized interval of time to said accumulated normalized running time; and
(6) repeating steps (2) through (5) during operation of the storage controller.

33. The controller as recited in claim 32, wherein said CPU is further configured to:
(7) initialize said accumulated calendar running time of said capacitor pack, prior to said step (2); and
(8) add said interval of time to said accumulated calendar running time;
wherein said step (6) comprises repeating said steps (2) through (5) and (8) during operation of the storage controller.

34. The controller as recited in claim 31, wherein said CPU is further configured to:
determine that said accumulated normalized running time of said capacitor pack is greater than said accumulated calendar running time, after reducing said operating voltage of said capacitor pack to said new value; and
increase said operating voltage of said capacitor pack, in order to increase an amount of energy stored in said capacitor pack.

\* \* \* \* \*